United States Patent
Shachar et al.

(10) Patent No.: US 7,283,154 B2
(45) Date of Patent: Oct. 16, 2007

(54) SYSTEMS AND METHODS FOR VIDEOCONFERENCE AND/OR DATA COLLABORATION INITIATION

(75) Inventors: Yair Shachar, Ramat Gan (IL); Isac Winter, Givat Shmuel (IL); Yaron Menczel, Dobbs Ferry, NY (US)

(73) Assignee: Emblaze V Con Ltd, Ra'Anana (IL)

( * ) Notice: Subject to any disclaimer, the term of this patent is extended or adjusted under 35 U.S.C. 154(b) by 0 days.

(21) Appl. No.: 10/801,112

(22) Filed: Mar. 16, 2004

(65) Prior Publication Data

US 2004/0239754 A1  Dec. 2, 2004

Related U.S. Application Data

(63) Continuation-in-part of application No. 10/032,146, filed on Dec. 31, 2001, now Pat. No. 6,831,675.

(51) Int. Cl.
*H04N 7/14* (2006.01)

(52) U.S. Cl. .............................. 348/14.08; 348/14.09; 348/14.12

(58) Field of Classification Search .. 348/14.01–14.09, 348/14.1, 14.12–14.13; 379/202.01; 370/260, 370/261; 709/204
See application file for complete search history.

(56) References Cited

U.S. PATENT DOCUMENTS

| | | | |
|---|---|---|---|
| 5,351,296 A * | 9/1994 | Sullivan | ....................... 705/70 |
| 5,689,553 A * | 11/1997 | Ahuja et al. | ........... 379/202.01 |
| 5,809,118 A | 9/1998 | Carmello | |
| 5,844,600 A * | 12/1998 | Kerr | ....................... 348/14.12 |
| 5,949,763 A | 9/1999 | Lund | |
| 6,349,324 B1 | 2/2002 | Tokoro | |
| 6,700,958 B2 * | 3/2004 | Hinderks | .................. 379/93.31 |
| 6,704,294 B1 * | 3/2004 | Cruickshank | ................ 370/265 |
| 6,831,675 B2 | 12/2004 | Shachar et al. | |
| 6,856,809 B2 * | 2/2005 | Fostick | ....................... 455/466 |
| 7,043,749 B1 | 5/2006 | Davies | |
| 2001/0056466 A1 * | 12/2001 | Thompson et al. | ......... 709/204 |
| 2003/0088619 A1 | 5/2003 | Boundy | |
| 2003/0122923 A1 | 7/2003 | Shachar et al. | |
| 2004/0239754 A1 | 12/2004 | Shachar et al. | |

FOREIGN PATENT DOCUMENTS

| | | |
|---|---|---|
| EP | 0721266 A | 7/1996 |
| EP | 0930766 A | 7/1999 |
| EP | 0743792 B1 | 3/2001 |
| EP | 1324608 A2 | 7/2003 |
| WO | WO 99/14951 A | 3/1999 |
| WO | WO 99/44363 | 9/1999 |
| WO | WO 99/ 44363 A | 9/1999 |

OTHER PUBLICATIONS

European Search Report, no date.

* cited by examiner

*Primary Examiner*—Melur Ramakrishnaiah

(57) ABSTRACT

Systems and methods to accept information regarding audio communication sessions (e.g., telephone calls) and, in response, initiate a videoconference and/or data collaboration session via for example data collaboration terminals associated with the audio terminals used for the audio communication sessions. The videoconferences and/or data collaboration sessions may be initiated using for example a voice call or session, for example, by using DTMF, SMS, SVD etc. The information required for the initiation of a videoconference or data collaboration session may for example be transmitted between user terminals, a centralized database may be used, or other methods may be used.

19 Claims, 13 Drawing Sheets

SYSTEMS AND METHODS FOR VIDEOCONFERENCE AND/OR DATA COLLABORATION INITIATION

CROSS REFERENCE TO RELATED APPLICATIONS

This application is a Continuation In Part of U.S. patent application Ser. No. 10/032,146, filed Dec. 31, 2001 now U.S. Pat. No. 6,831,675, entitled "SYSTEM AND METHOD FOR VIDEOCONFERENCE INITIATION", which is incorporated in its entirety herein by reference.

FIELD OF THE INVENTION

The present invention relates to videoconferencing; specifically, to systems and methods for easy and convenient initiation of videoconferences and/or data collaboration sessions.

BACKGROUND OF THE INVENTION

Currently, a user may generate an audio telephony call or session using an audio communication terminal such as a telephone or personal computer (PC). Initiation of such a session may be simple—typically, a user merely enters a telephone number of another party. Conversely, the initiation of videoconference and/or data collaboration sessions may be relatively complex. A separate and complex system may be required, including a centralized control system, which may require specialized instructions to operate. First, a user might ascertain whether or not the other party (or parties) with which the user wishes to have a videoconference and/or data collaboration session possesses videoconference and/or data collaboration capabilities, and, if so, what their address is. Then, typically, a centralized control system must be operated to link the parties. Users wishing to hold a videoconference and/or data collaboration session may not have access to or control over a specialized videoconference and/or data collaboration equipment. Other methods for initiating and conducting such sessions may be used. Therefore, it is difficult to quickly or spontaneously arrange a videoconference and/or data collaboration session; advance scheduling is often required.

Furthermore, currently, it is not possible to initiate an audio communication session and later to extend the session to include videoconference and/or data collaboration without carrying out the complicated steps generally required for generating a videoconference and/or data collaboration session.

Therefore, a need exists for a system and method to allow for the quick and easy initiation of a videoconference and/or data collaboration session. Furthermore, a need exists for a system and method to allow for the initiation of a videoconference and/or data collaboration session from an audio communication session.

SUMMARY OF THE INVENTION

Embodiments of the system and method of the present invention may enable accepting of information regarding an audio communication session (e.g., a telephone or voice call, or another type of audio session) from audio communication terminals and, in response, initiating a videoconference and/or data collaboration session, preferably via data collaboration terminals enabled for videoconference and/or data collaboration sessions, associated with the audio terminals used for the audio communication sessions.

According to some embodiments of the present invention, tone dialing, for example, Dual-Tone Multi-Frequency (DTMF) may be used to transmit suitable data to initiate a videoconference and/or data collaboration session from a plurality of audio communication terminals. In some embodiments silent DTMF may be used. In some embodiments Simultaneous Voice and Data (SVD) technology may be used to initiate a videoconference and/or data collaboration session from a plurality of audio communication terminals. Other conduits or codes for data may be used.

According to some embodiments of the present invention, an SMS server and/or Internet Location Server may be provided. Such servers may enable a videoconference and/or data collaboration session to be initiated using SMS messaging from an audio communication terminal.

According to some embodiments of the present invention, a Voice Gateway may be provided, to enable a videoconference and/or data collaboration session to be initiated using an audio communication terminal.

BRIEF DESCRIPTION OF THE DRAWINGS

The present invention will be understood and appreciated more fully from the following detailed description taken in conjunction with the drawings in which.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

The phrase "voice session" as used herein may encompass for example an audio based or initiated link, call, or active connection between two or more communication devices. A voice session may include transmission of analog and/or digital data, and may enable transfer of session data, audio data, and/or other relevant data. The phrase "videoconference and/or data collaboration" as used herein may encompass for example a video based link, call, or active connection between two or more communication devices enabled to transmit video data and/or other data. The phrase "data collaboration terminal" as used herein may encompass any suitable output device, display system, processing unit, computing terminal, embedded system, personal computer, network computer, mobile communications device, set top box, videoconferencing embedded systems, or other hardware, software, or hardware and software combinations that may be used for implementing a video only session, audio only session, videoconference, and/or data collaboration session. The phrase "audio communications terminal" as used herein may encompass any telephonic or other device, wireless or line based, that may be used to conduct an audio session between two or more users, such as a telephone, a personal computer with telephony capability, or other suitable device. The phrase "videoconference server" as used herein may encompass any suitable server for enabling initiation and/or execution of video conferencing sessions, data collaboration sessions, or other suitable communication sessions. The phrase "data collaboration session" as used herein may encompass any suitable communication session between two or more users, including videoconferencing sessions or other suitable data sessions. The phrase "audio telephony session" as used herein may encompass any telephony session or other suitable audio communications session between two or more users.

Figure 1:
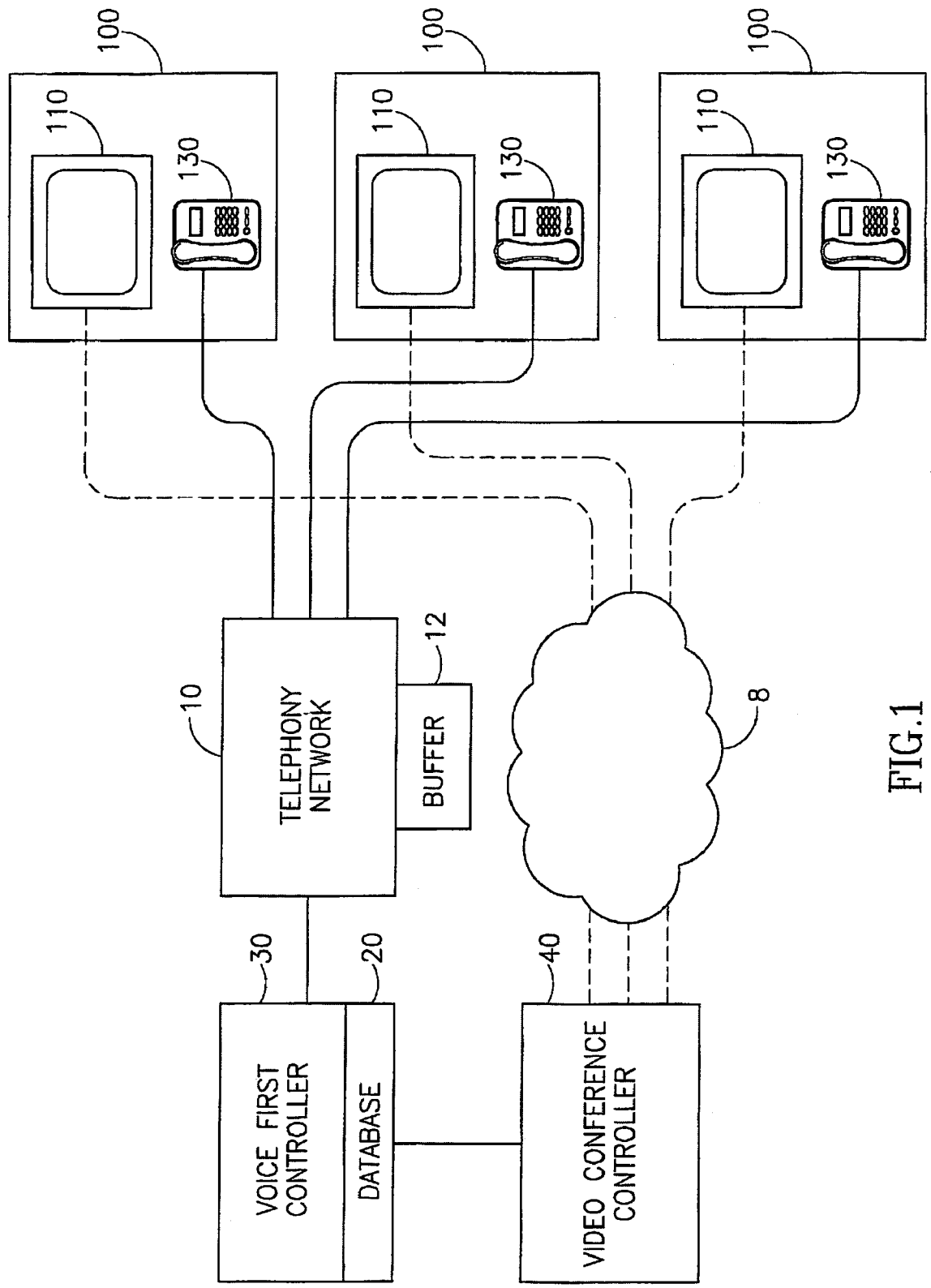
FIG. 1 depicts a network including a videoconference and/or data collaboration system according to an embodiment of the present invention.

FIG. 1 depicts a network including a videoconference and/or data collaboration system according to an embodiment of the present invention. Referring to FIG. 1, a plurality of user sites 100 each include data collaboration terminals 110 and audio communication terminals 130. Data collaboration terminals 110 and audio communication terminals 130 may be combined into a single unit (e.g., for example, a PC or other unit including multiple capabilities, or another suitable unit), or may be in separate units. User sites 100 may be, for example, homes, offices or other sites, and may be distributed within an organization or enterprise, or among various organizations, among individuals, and at addition sites. For example, a user site 100 may be a user's home or office. Preferably, a data collaboration terminal 110 is a device including the ability to acquire video data from a device such as a camera, a display device displaying the video data for videoconferencing such as a PC screen, and compression/decompression software and/or hardware. Other types of data collaboration terminals may be used and fall within the scope of the invention, having other capabilities. Associated audio communications terminals and data collaboration terminals need not be physically located at the same site, and need not be combined within one unit. A diversity of types of such units may be used with one system.

Preferably, an audio communication terminal 130 may include a device allowing an audio conversation, for example a telephone or a PC having telephone-over-IP capabilities; other devices may be used for audio communication terminals. In other embodiments audio communication terminal may have SMS messaging capabilities, Internet access capabilities, and/or other suitable communications capabilities. Preferably, each audio communication terminal 130 has a unique telephone address such as a telephone number or telephone number and extension combination; in alternate embodiments audio communication terminals may have other sorts of addresses, for example, an Internet Protocol (IP) address.

The audio communication terminals 130 may be interconnected via one or more telephony networks 10. Telephony networks 10 communicate with audio communication terminals, each other, and possibly other networks to conduct and transmit audio telephony. Telephony networks 10 may include, for example, a private branch exchange (PBX) operating within an enterprise, or other networks transmitting audio and other information, such as intranets or the Internet, or cellular networks. Endpoints such as audio communication terminals 130 may be required to register or be registered with a telephony network 10 providing service to the endpoint, and the telephony network 10 may assign an identification (ID), a telephone number/address and/or an extension to endpoints.

In an exemplary embodiment a telephony network 10 includes a buffer 12 for storing portions of audio conversations for delaying the timing of such conversations. In alternate embodiments such buffering need not be required, or the buffering functionality may be provided by different systems. Alternative buffering functionality may be provided.

Other methods of interconnecting audio communication terminals 130 may be used. A communications network 8 may be available to interconnect various devices. Communications network 8 may be used to augment the interconnection provided by networks such as telephony networks 10. The communications network 8 may include a series of networks, such as the Internet, local LANs, intranets (such as enterprise intranets), DSL or xDSL lines, cellular networks, and other networks or combinations of networks.

Data collaboration terminals 110, are connected to communication network 8. In some embodiments a controller 40 such as videoconference controller or a data collaboration conference controller is in communication with data collaboration terminals 110 via networks such as the communications network 8. The controller 40, which may be enabled to implement videoconference and/or data collaboration sessions, may initiate a videoconference and/or data collaboration session between various data collaboration terminals 110. The controller 40 may be a known videoconference controller, such as the Media Xchange Manager™ provided by VCON, of Herzliya, Israel. In an exemplary embodiment, the controller 40 includes common videoconferencing and/or data collaboration capabilities, such as managing and configuring endpoints, call initiation, call transfer, conference calling, and other features. Controller 40 may in different embodiments have varied capabilities, such as videoconference capability alone, data collaboration capability alone, a combination of video, data and audio capability, etc. For example, controller 40 may be a videoconference server, which includes data collaboration capability, or a server not including video capability.

In one embodiment, a database 20 stores information on registered users or user sites 100. Such information may include, for example, a telephone number or other address of an audio communication terminal 130, an IP address, Media Access Control (MAC) address, or other address of a data collaboration terminal 110, and/or other information such as a user name or ID, physical location, alternate contact information, etc. The database 20 may be used to produce the address of a data collaboration terminal 110 when presented with the address (e.g., telephone number or other suitable identification) of an audio communication terminal 130 located at the corresponding user site 100 of the data collaboration terminal 110. In alternate embodiments, multiple audio communication terminals 130 may be so associated with a data collaboration terminal 110, and multiple data collaboration terminals 110 may be so associated with an audio communication terminal 130. The database 20 may be implemented through known methods, such as by using databases implementing the Lightweight Directory Access Protocol (LDAP), the Open Database Connectivity (ODBC) standard, or via other methods, such as methods not including standards. In alternate embodiments a separate database may not be needed, and information linking audio communication terminals 130 and data collaboration terminals 110 may be linked in other manners. A telephony network 10 and endpoints such as audio communication terminals 130 and data collaboration terminals 110 may be required to register or be registered with the database 20.

In an exemplary embodiment, a voice first controller 30 is in communication with the database 20, the controller 40, and also with one or more telephony networks 10. The voice first controller 30 may be in communication with other networks such as communications network 8; such networks may provide a link to telephony networks 10 or other entities. The voice first controller 30 preferably operates to detect an audio communication (e.g., an audio telephony call or session) between two or more audio communication terminals 130, and, in response requests the controller 40 to initiate a videoconference and/or data collaboration between the data collaboration terminals 110 located at the user sites 100 possibly including the audio communication terminals 130 conducting an audio communication session.

Preferably, certain telephony networks 10 include functionality allowing reporting of audio communication sessions among audio communication terminals 130 to other equipment. Such reporting may include information such as the telephone number or other identification of the audio communication terminals 130 involved, or other information. A telephony network 10 and a voice first controller 30 may communicate over, for example, communications network 8, or by other known means. Such functionality may be easily added to current telephony networks.

Figure 2:
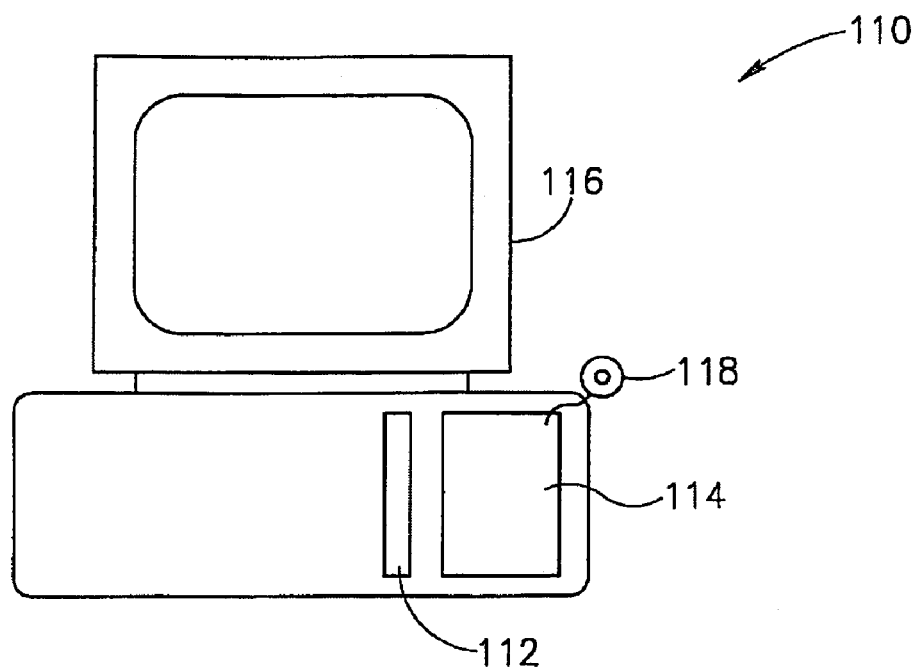
FIG. 2 depicts a data collaboration terminal used with an embodiment of the present invention.

FIG. 2 depicts a data collaboration terminal used with an embodiment of the system and method of the present invention. Other sets of components and functionality may be used. In one embodiment, data collaboration terminal 110 is a PC including a communications/networking card 112, a videoconference and/or data collaboration hardware set 114 such as a videoconference and/or data collaboration card, a monitor 116, and a video camera 118. Preferably the data collaboration terminal includes compression/decompression software and/or hardware. The data collaboration terminal 110 may also contain audio acquisition and play devices (e.g., an audio headset, or microphone and speaker), audio compression/decompression software and/or hardware, and a communication interface. Videoconference and/or data collaboration hardware set 114 may be of known construction, such as a commercially available PCI system including video compression/decompression capabilities. Videoconference and/or data collaboration hardware set may be embodied in a set top box, or other suitable data collaboration terminal equipment. Data collaboration terminal 110 may include, for example, the ViGO™ system, the Escort 25 PCI card, VCON's HD3000 system, HD5000 system, Vpoint software (VCON Ltd., Herzlia, Israel; www.vcon.com), or other suitable hardware components. Data collaboration terminal 110 may include software enabling videoconference and/or data collaboration capabilities. Preferably, the data collaboration terminal 110 is responsive to remote initiation of videoconference and/or data collaboration sessions. For example, H.323, H.320, Session Initiation Protocol (SIP), or other suitable standards may be used to enable remote initiation of videoconference and/or data collaboration sessions. Data collaboration terminal 110 may include other suitable software, hardware or software and hardware combinations, and need not be a PC.

Other configurations are possible. In alternate embodiments data collaboration terminals 110 may include other devices, such as specialized data collaboration terminals or telephones, cellular devices, the assemblies of videoconference and/or data collaboration equipment (camera(s), microphone(s), controller, video screen) commonly set up in, for example, conference rooms, or other devices or assemblies. In one embodiment, the data collaboration terminal 110 may include audio telephony capability, and thus may include an audio communication terminal 130. A data collaboration terminal 110 may be implemented in software; for example, a data collaboration terminal 110 may be a software application running on a PC or other device, using the hardware provided with that device. Known methods of providing audio telephony capability to devices such as PCs may be used.

Figure 3:
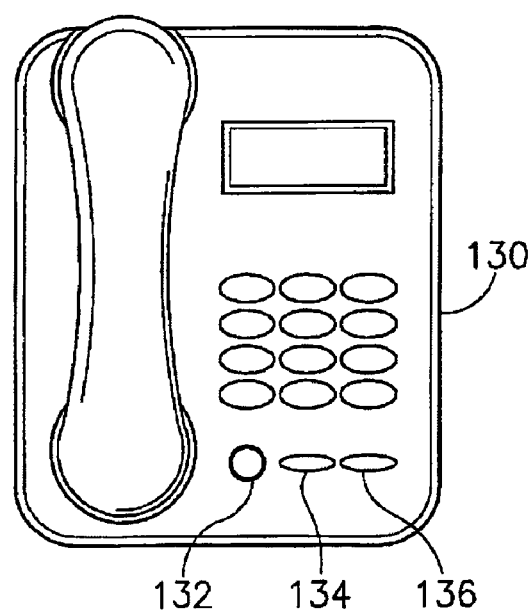
FIG. 3 depicts an audio communication terminal used with an embodiment of the present invention.

FIG. 3 depicts an audio communication terminal used with an embodiment of the system and method of the present invention. In an exemplary embodiment, audio communication terminal 130 is an audio telephone or audio handset of known construction, and preferably includes a video indicator 132, for indicating whether or not a party in an audio conversation has video capability and is available, a video button 134, for indicating a user's preferences regarding participation in a videoconference and/or data collaboration, and a videoconference and/or data collaboration button 136, for allowing a user to indicate a videoconference and/or data collaboration is desired. The video indicator 132 may be, for example, an LED or other lamp, or an indicator on the display of the audio communication terminal 130 (if such a display is included). In alternate embodiments, the video indicator 132 need not be included, or may be in other forms. For example, if the audio communication terminal 130 is included within a workstation or PC, the video indicator 132 may be an icon or other indication on a monitor. Similarly, in alternate embodiments, the video button 134 and/or the videoconference and/or data collaboration button 136 need not be included, or may be in other forms. For example, if the audio communication terminal 130 is included within a workstation or PC, the video buttons' functionalities may be achieved via icons or key presses.

Figure 4:
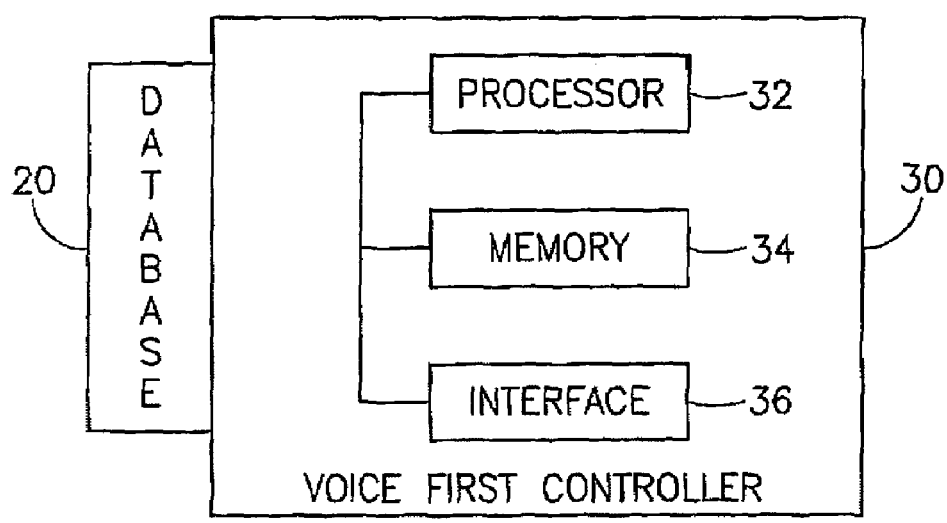
FIG. 4 depicts a voice first controller and database according to an embodiment of the present invention.

FIG. 4 depicts a voice first controller 30 and database 20 according to an embodiment of the system and method of the present invention. In an exemplary embodiment, the voice first controller 30 and database 20 are co-located at the same site or within the same device. The database 20 preferably includes information regarding registered user sites of user sites 100; such a database may be located in a different device or at a different site from the voice first controller 30. The voice first controller 30 may be implemented within a workstation such as a PC implementing the Windows™ operating system or a workstation implementing Linux; such a workstation or PC may include other functionality, such as network control functionality. In an alternate embodiment, a system including voice first controller 30 capability may be a standalone system. In the embodiment depicted in FIG. 4, voice first controller 30 includes processor 32, which may be, for example, one or more microprocessors, memory 34, and network communications interface 36.

Figure 5:
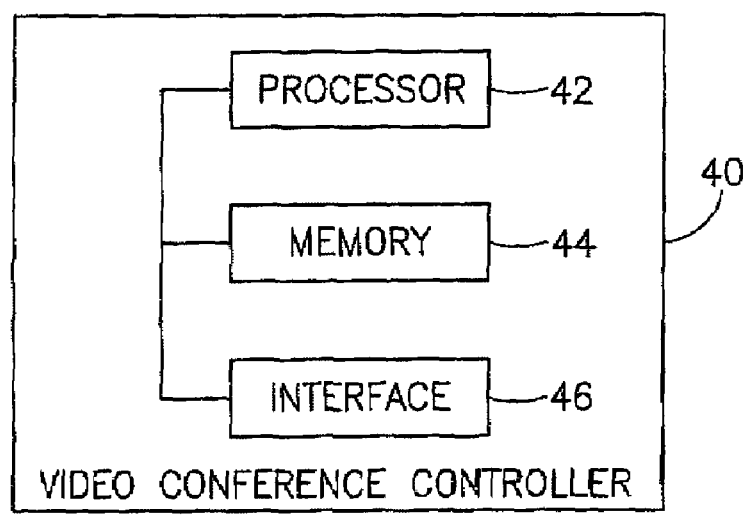
FIG. 5 depicts a videoconference controller according to an embodiment of the present invention.

FIG. 5 depicts a controller 40 according to an embodiment of the system and method of the present invention. In an exemplary embodiment, the controller 40 includes a processor 42, which may be, for example, one or more microprocessors, a memory 44, and a network communications interface 46. In alternate embodiments, controller 40 may be located at the same site with or in the same device as the voice first controller 30 and/or database 20.

In alternate embodiments, the location and functionality of the database 20, voice first controller 30, and/or controller 40 may differ. For example, a PBX or other telephony network, intranet, or other network may include the functionality of the database 20, voice first controller 30, and/or controller 40. Such functionality may be included with existing telephony network or network equipment. The functionality of the database 20, voice first controller 30, and/or controller 40 may be located in one location, separate from a telephony network or from network equipment.

Other systems for connecting the various components may be used. For example, some or all of the various audio communication terminals 130 may be connected by a local network such as a LAN or intranet, which may include PBX such as an IP PBX; such a PBX may function as the telephony network 10 of FIG. 1. The various data collaboration terminals 110 may similarly be connected by a local network such as a LAN or intranet. Each network may be connected to a voice first controller 30 via, for example, a bridge or router; alternately, the voice first controller 30 may be included in one of the local networks.

In a further embodiment, some or all of the various audio communication terminals 130 may be connected by an Integrated Services Digital Network (ISDN) or Public Switched Telephone Network (PSTN) telephone network including, for example, a PBX such as an ISDN PBX or other PBX which may include an analog/digital unit. The ISDN PBX may be connected to a voice first controller 30 via, for example, a gateway; alternately, the voice first controller 30 may be included in one of the local networks.

In further embodiments some or all of the various audio communication terminals 130 may be connected by the communications network 8. The communications network 8 or portions of the communications network 8 connecting the audio communication terminals 130 may be the same as or separate from the communications network 8 or portions thereof that connect the data collaboration terminals 110.

According to some embodiments of the present invention, a user at a user site 100 operating an audio communication terminal 130 initiates an audio communication session (e.g., a telephone call or other suitable session) to another audio communication terminal 130. Preferably, the user using the audio communication terminal 130 simply enters the telephone number associated with the receiving audio communication terminal 130 (commonly termed "dialing" despite the current rarity of telephone number dials, and despite that such functionality may be entirely computerized). The audio communication session is initiated and maintained via the telephony network 10. While, typically, the initiation of an audio communication session is from one party calling a second party, audio communication sessions may take place among more than two parties.

Preferably, the telephony network 10 servicing the relevant audio communications terminals reports the audio communication session to a voice first controller 30. Preferably, a call detail record (CDR) including, for example, the telephone number/address or other identification of the audio communication terminals 130 involved is passed; in alternate embodiments other information may be passed. In the case that more than one telephony network 10 services the audio communications terminals 130 (e.g., audio communications terminals are on different telephony networks) each telephony network 10 may report the session; alternately only one network may report the session.

The voice first controller 30 accesses the database 20 for information regarding the audio communication terminals 130 involved. Preferably, the voice first controller 30 accesses information regarding whether or not videoconference and/or data collaboration capability exists for terminals associated with the relevant audio communication terminals 130, and the IP or other address of the relevant data collaboration terminals 110 associated with the audio communication terminals 130.

In one embodiment, the voice first controller 30 determines status and availability information regarding the relevant data collaboration terminals 110. In alternate embodiments, status and/or availability information for audio communication terminals 130 may be checked. The voice first controller 30 accesses the database 20 to translate the identity of the relevant communication terminals 130 into an address or identity for the associated data collaboration terminals 110. The voice first controller 30 forwards this information to the controller 40 and requests from the controller 40 the status of each data collaboration terminal 110 associated with the audio communication terminals 130—e.g., whether such terminals are active and accessible, and can participate in a videoconference and/or data collaboration. The controller 40 may directly access such data collaboration terminals 110 to determine such information, or may perform this operation in other manners. In an exemplary embodiment, the controller 40 communicates with the various data collaboration terminals via networks such as the communications network 8 (in which case the connections between the controller 40 and certain data collaboration terminals in FIG. 1 may be via the communications network 8).

In alternate embodiments, status and information on audio communication terminals 130 and data collaboration terminals 110 may be determined in different manners. For example, the controller 40 may not perform such actions; other components may gather such information in different manners.

In one embodiment, the voice first controller 30 determines, from the status information, which data collaboration terminals 110 are eligible to participate in the videoconference and/or data collaboration, and passes this information to the controller 40. Information and commands passed between the voice first controller 30 and controller 40 may be passed directly or by means of third entity; in alternate embodiments the voice first controller 30 and controller 40 functionalities may be in the same device.

An indication may be provided to participants in the audio session if any of the other users have video capability which is operational and in communication with the controller 40. In a typical embodiment, if any of the users have video capability which is operational and in communication with the controller 40, a video indicator 132 indicates such information to the other users. In alternate embodiments, a video indicator 132 may indicate other information.

If the users participating in the audio communication session desire to enter a videoconference and/or data collaboration, one or more users may activate the appropriate videoconference and/or data collaboration, for example, by pushing on a button 136, clicking on a mouse, or by other means. The audio communication terminal 130 transmits a signal regarding the user action to, typically, the relevant telephony network 10. In a typical embodiment, each user with active and accessible videoconference and/or data collaboration capability presses their appropriate videoconference and/or data collaboration button 136 before the videoconference and/or data collaboration may be started. In alternate embodiments, other protocols may be used. For example, a user may press a videoconference and/or data collaboration button 136 to grant permission to be viewed in videoconference and/or data collaboration mode. The videoconference and/or data collaboration button 136 may be an on/off type switch such that, when on, allows or causes a videoconference and/or data collaboration to be automatically started at the time of the initiation of the audio session. If the videoconference and/or data collaboration button 136 is in one position, it is an indication that the user is allowing a videoconference and/or data collaboration, if in another position, the user is not allowing such a conference.

In alternate embodiments, no "permission" capability need be included, or such permission information may be ascertained through other methods. For example, a video button 134 and/or videoconference and/or data collaboration button 136 may be included on a data collaboration terminal 110, or a setting on a PC acting as an audio communication terminal 130 or a data collaboration terminal 110 may be ascertained. In further embodiments, other user preferences may be taken into consideration when initiating and carrying out videoconference and/or data collaborations. In alternate embodiments, other methods may be used, and other signals may be generated, to initiate a videoconference and/or data collaboration.

Information regarding the video button 134 and/or videoconference and/or data collaboration button 136 may be transmitted to the controller 40 directly from audio communication terminals 130 or via the relevant telephony network 10, or in other manners.

The controller 40 initiates a videoconference and/or data collaboration among the set of the data collaboration terminals 110 associated with the audio communication terminals 130, or a subset of such data collaboration terminals 110, depending on information such as permission and availability information.

Some data collaboration terminals may have a requirement that they be set to a certain mode, e.g. an answer, autoanswer or other mode, to be receptive to a videoconference controller command to initiate a videoconference and/or data collaboration. In such a case, the relevant data collaboration terminals 110 are in such a mode prior to the initiation of the videoconference and/or data collaboration, or just before the videoconference and/or data collaboration, the controller 40 sends a command to the relevant data collaboration terminals 110 to enter such a mode. In alternate embodiments, such a mode change need not be required. For example, a data collaboration terminal not in such a mode may accept a command requiring the initiation of a videoconference and/or data collaboration without an answer or user acceptance. In further embodiments, a data collaboration terminal may not be able to "autoanswer" and be forced into a videoconference and/or data collaboration. In such a case, a user action, such as a "pickup" or answer, may be required after the controller 40 requests the data collaboration terminal to enter a videoconference and/or data collaboration.

After the controller 40 requests the relevant data collaboration terminals 110 to enter the videoconference and/or data collaboration, the videoconference controller may need to join the data collaboration terminals 110 into the videoconference and/or data collaboration.

The videoconference and/or data collaboration takes place simultaneously with the audio communication session. Preferably, no audio is transmitted via the videoconference and/or data collaboration, and the audio communication session transmits the audio channel of the videoconference and/or data collaboration, although the audio and video data may both be transmitted via the videoconference and/or data collaboration. The relevant data collaboration terminals 110 display and capture video data associated with the videoconference and/or data collaboration, and the relevant audio communication terminals 130 output and capture the audio data associated with the videoconference and/or data collaboration. The user may continue to use the audio communication terminals 130 to communicate, even after the data collaboration terminals 110 enter the videoconference and/or data collaboration.

In some videoconference and/or data collaboration systems, the transmission and display of captured video images may be delayed a certain amount, possibly due to compression and decompression, or due to other causes. Therefore, audio data transmitted by the audio communication session may be delayed a similar amount, in order that the users perceive the video and audio data as being in synchrony. In an exemplary embodiment, this delay is performed by buffering capability included at the relevant telephony network 10; in alternate embodiments other delay methods may be used. For each audio channel associated with a video channel, the audio data enters a buffer where it is held a certain amount of time before being forwarded onward. Such capability is easily added to current telephony networks. In alternate embodiments, delay capability may be added to other components, such as the audio communication terminals 130.

Various methods may be used to determine the time delay. In one embodiment, a fixed time delay may be used. In another embodiment, for each audio communication session, the delay may be fixed beforehand by the characteristics of the components involved, such as the data collaboration terminals 110 or any equipment or networks transmitting videoconference and/or data collaboration data (e.g., network or controller 40 load), and a delay calculated. Data on such equipment may come from the database 20 (e.g., the known delay for the data collaboration terminal 110, network, or other equipment associated with each user), from a query to the relevant equipment at the time of the initiation of the videoconference and/or data collaboration, or by other methods. In yet a further embodiment, the actual delay of the video data experienced by the data collaboration terminals 110 may be periodically ascertained during the videoconference and/or data collaboration, and the delay adjusted accordingly. In certain embodiments, data on a delay may need to be transmitted from, for example, the controller 40, to other equipment such as the telephony network 10.

In alternate embodiments, different series of steps may be used. In alternate embodiments, a database lookup need not be required. Furthermore, different sets of status information, may be used, or no status information may be required.

Embodiments of the system and method of the present invention eliminate the requirement of planning a videoconference and/or data collaboration in advance. The requirement of having training and access to videoconference and/or data collaboration equipment separate from preferably simple and ubiquitous audio communication terminals 130 may be eliminated, simplifying the process of initiating a videoconference and/or data collaboration session. Preferably, the initiation of such a session becomes as easy as initiating a telephone call.

Preferably, any set of users (e.g., two or more) communicating by audio terminals may participate in videoconference and/or data collaboration sessions using the system and method of the present invention. An additional user may enter an existing teleconference via steps similar to those described herein. When a teleconference is initiated, the various components of embodiments of the system of the present invention may add users of the teleconference to the videoconference and/or data collaboration.

Preferably, if a user "hangs up" or otherwise terminates an audio communication session, or if the user switches the setting on the video button 134 and/or videoconference and/or data collaboration button 136 to indicate no video is desired, the videoconference and/or data collaboration may be stopped with respect to that user. In one embodiment, if the video button 134 and/or videoconference and/or data collaboration button 136 is pressed, or if the video button 134 and/or videoconference and/or data collaboration button 136 setting is altered, the audio communication terminal 130 passes this information to the voice first controller 30. If the audio communication session is ended, the relevant telephony network 10 passes this information to the voice first controller 30. The voice first controller 30, in turn causes the controller 40 to remove the relevant data collaboration terminal 110 from the videoconference and/or data collaboration. In alternate embodiments, other situations may cause the cessation of a videoconference and/or data collaboration.

In further embodiments, an existing audio communication session which has no current videoconference and/or data collaboration may have a videoconference and/or data collaboration included. For example, a user may alter a setting on a switch on a data collaboration terminal 110 or an audio communication terminal 130 to easily initiate a videoconference and/or data collaboration to complement an existing audio communication session.

In further embodiments, an audio communication session may cause the initiation of a one-way videoconference and/or data collaboration. For example, in the case of a party calling a call center, video information may be transmitted from the call center to the calling party. Such a one-way video session may be initiated by an embodiment of the present invention.

Figure 6:
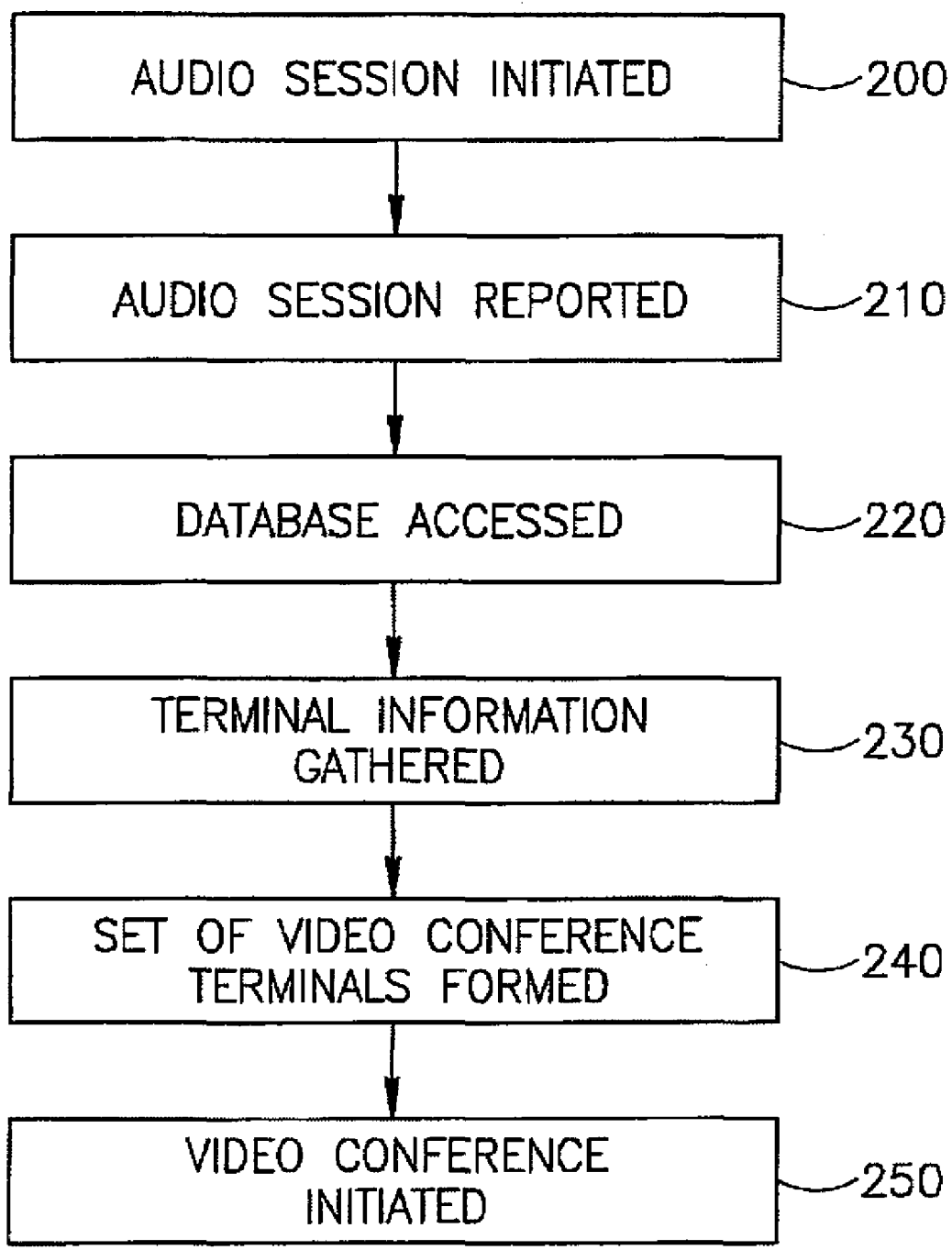
FIG. 6 is a flow chart depicting a method for initiating a videoconference and/or data collaboration according to an embodiment of the present invention.

FIG. 6 is a flow chart depicting a series of steps for initiating a videoconference and/or data collaboration according to an embodiment of the system and method of the present invention. While some embodiments herein are described with respect to a videoconference session, other embodiments may be based on or include audio communications sessions, possibly without any videoconference. For example, a set of audio communication terminals may be conducting an audio conference, and a data collaboration session may be initiated among them.

Users requiring videoconference, audioconference and/or data collaboration facilities may install a video/data collaboration application (herein referred to as "VDCA"), along with which an association code may be received, to a data collaboration terminal 110. The installation process may include downloading the VDCA, loading it from a CD, or otherwise installing the VDCA. Installation may be manual, automatic, or initiated from a central server without the user intervention. A registration procedure, which may be a one time event, may be initiated on the user's data collaboration terminal 110, for example, by an application that may reside on the data collaboration terminal 110, or on a web server. As part of the registration process, for example, the user may provide telephone identification data, for example, of audio communication terminal 130 (e.g., PSTN telephone number) that a user desires to be associated with the VDCA. The registration application may generate an association between the user's audio communication terminal 130 and data collaboration terminal 110, for example, using one or more unique identifiers (e.g., the PC terminal's MAC Address, current IP address, Global Unique ID (GUID), or other identifications attributes. This association between the audio communication terminal identification data and data collaboration terminal identifier(s) may be stored in a central database 20, for example, a database associated with voice first controller 30, which may be distributed among a plurality of locations. In alternate embodiments, installation and/or registration need not be required; for example a user may obtain equipment from a manufacturer or retailer with such capability already installed.

At block 200 a user may initiate an audio session. For example, a user may initiate a telephone call using an audio communication terminal 130. While, typically, such an initiation occurs between two parties who are not yet in audio contact, embodiments of the system and method of the present invention may allow for an existing audio session between two or more parties which may include existing videoconference and/or data collaboration sessions to add additional audio and video participants. For example, one of two parties engaged in an audio session and/or a videoconference and/or data collaboration session may contact a third via telephone; the third party may then be automatically joined in to the videoconference and/or data collaboration session.

At block 210, the telephony network(s) 10 servicing the audio communication terminals 130 may report(s) the audio communication session. Preferably, such information is reported to a voice first controller 30, but other components or combinations of components may receive and act on such information. For example, functionality within a telephony network 10 may detect a telephony session and perform steps 220-250, below. In some embodiments a PBX associated with telephony network 10 may receive, process and/or transmit relevant data.

At block 220, a database is accessed for information regarding the relevant audio communication terminals 130. In alternate embodiments, a database access need not be required.

At block 230, status and availability information is determined regarding the relevant data collaboration terminals 110 and possibly regarding the associated audio communication terminals 130. In an exemplary embodiment, a controller 40 is polled for the status of the relevant data collaboration terminals 110. In alternate embodiments, status and availability information may include other data and may be determined through other methods. For example, the relevant audio communication terminals 130 may be polled for certain settings.

At block 240, it is determined which data collaboration terminals 110 are able to participate in the videoconference and/or data collaboration. While, preferably, this determination is made by a voice first controller 30, in alternate embodiments this determination may be made by other components, such as a controller 40. An indication may be provided to participants in the audio session if any of the other users have video capability which is operational and in communication with the controller 40. In some embodiments, only a data collaboration session or only a videoconference may be added. For example, in some embodiments of the present invention, a data collaboration session may be added to an audio session, with no video session and no video equipment being involved.

At block 250, a videoconference and/or data collaboration may be initiated among the relevant data collaboration terminals 110. Preferably, a controller 40 or a data collaboration terminal performs such a function, although other components may perform this function. In one embodiment, users may be required to signal their desire to enter a videoconference and/or data collaboration prior to the videoconference and/or data collaboration. The voice first controller 30 and/or controller 40 may command the VCC 1120 to imitate the video/data session and remotely activate the VDCA sessions using the data collaboration terminal(s) 110. For example, Remote Call Initiation (RCI) may be used to initiate a videoconference or data collaboration session between two or more data collaboration terminals. In alternate embodiments, user signals need not be required. In alternate embodiments, other series of steps may be performed.

Various problems may be associated with starting a videoconference and/or data collaboration session. For example, if the other party's IP information was changed, the session has to cross a firewall, the remote system is unreachable, or other problems arise, the two parties may need to establish a voice call or session to coordinate the videoconference and/or data collaboration and the video videoconference and/or data collaboration parameters. According to some embodiments of the present invention, a system and method are provided for initiating a videoconference and/or data collaboration session from a voice session, for example, a PSTN, ISDN, or cellular voice session. Accordingly, an IP call initiation may be embedded into a regular voice session, thereby enabling the establishment of a videoconference and/or data collaboration session in a similar way to the initiating of a regular PSTN or ISDN voice session, regardless of the PBX the company is using, or with no PBX at all.

In one embodiment, IP negotiation over a voice channel, for example, Public Switch Telephony Network (PSTN) may require exchanging of the IP session parameters using an IP parameters exchange protocol over the PSTN call. Such a protocol may require a generic way to transmit binary data over a voice session. In one embodiment the necessary IP negotiation may be enabled by sending information using tone dialing, for example, Dual-Tone Multi-Frequency (DTMF) or other frequencies over a voice line. In other embodiments Simultaneous Voice and Data (SVD) technology may be used to send data from audio communication terminals.

A problem that may be associated with usage of DTMF is that the transmission of the binary information can disturb the voice session for a period of time and may lead to cuts and irritating interference. In order to eliminate or lower this interference the DTMF sounds may be wholly or partially silenced on the receiving side, while letting the other (sending) party voice be heard throughout the time of the negotiation. Silenced DTMF is herein referred to as silent DTMF.

In some embodiments Simultaneous Voice and Data (SVD) technology (AT&T Paradyne, http://www.paradyne.att.com) may be used to initiate a videoconference and/or data collaboration session from a plurality of audio communication terminals. In this way, a voice channel may be used to transmit suitable data between users.

According to some embodiments of the present invention, because the IP link may be unstable, the audio + video session conducted via the IP link may reduce the quality of the videoconference and/or data collaboration content. As is well known, the eye is less sensitive than the ear to delays in transmission or to transmission latencies. Thus, in case of poor bandwidth or throughput, the video stream may be maintained through the IP link while the audio portion of the session may be made to remain in the PSTN voice channel, thereby eliminating the packet loss problem and the latency of the audio that is a major drawback of audio over IP calls. Additionally, the audio channel may enable freeing of more bandwidth to the video portion. In some cases, the audio communication terminals 130 may include a provision to delay the audio, for the purpose of maintaining the synchronization between the separated audio and video streams. In this way the miss synchronization between audio and video information (e.g., lip sync) may be reduced or avoided.

In some embodiments of the present invention wide band audio, which may have a quality superior to that of G.711 (e.g., standard phone calls) may be used. The voice quality when using PSTN lines may be limited, for example, because of the maximum voice frequency that can be transmitted. A digital connection (e.g., using a modulated signal over a PSTN line) may enable the voice data to be compressed so that a higher frequencies may be transmitted. This may enable improved voice quality over standard PSTN lines. To implement a wide band audio connection the analog voice signal may be sampled and converted to a digital form, and then compressed by a codec, for example G.722.1 or other suitable protocols. Upon user request the terminals may send a command code (e.g. DTMF code) to a remote terminal. If the remote terminal recognizes and accepts the use of this method, the terminals may synchronize a modem connection and transmit the compressed audio data. For example, if both or all users agree on using high quality audio, the users may send a signal to the system, which may then negotiate a modem session over the PSTN line and may start using, for example, a 50K modem session for wide band compressed audio (e.g., G.722 at 48 Kbps or G.722.1 at 24 Kbps).

Figure 7A:
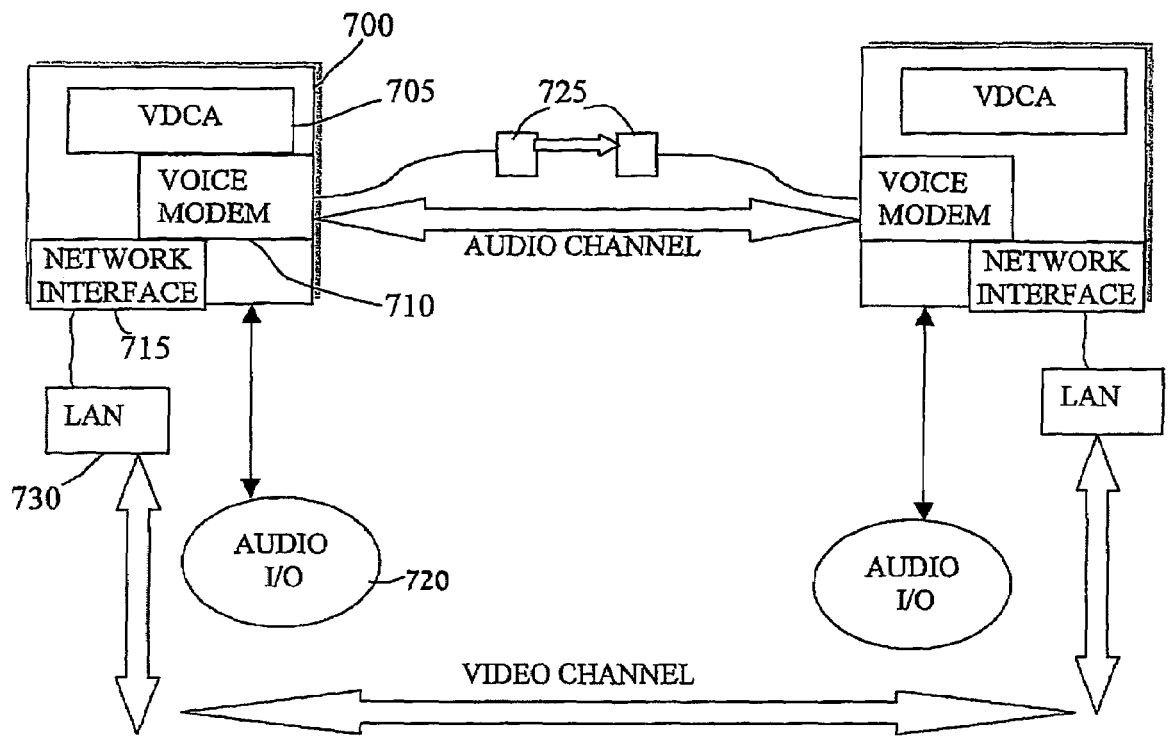
FIGS. 7A depicts a workflow between components of a videoconference and/or data collaboration system, according to some embodiments of the present invention.

Various configurations may be used to initiate a videoconference and/or data collaboration session from an audio communication terminal 130, according to some embodiments of the present invention. In one embodiment, as can be seen with reference to FIG. 7A, a configuration is provided to enable point-to-point call initiation with a voice modem. In such a configuration the data collaboration terminal 700 may use a voice modem 710 to generate a PSTN voice session (e.g., dialing a POTS number). For example, as depicted by FIG. 7A, a user may initiate a voice call or session using a data collaboration terminal 700 with a videoconferencing or data collaboration application (VDCA) 705 (e.g., HD5000, HD3000 or other suitable application software), voice modem 710, network interface 715 (e.g., network interface card (NIC), network adaptor, or other form factor of network interface implementation), and an audio input/output (I/O) devices 720 (e.g., microphone and speakers). The user terminals 700, for example, using communication endpoints 725, may exchange IP information for generating an IP video link via this voice session.

In the case where the users agree to add a video link, a user, herein referred to as initiator, may initiate a videoconference or data collaboration session by dialing a number (e.g., dialing *, #, another suitable character or combination of characters), pressing a button etc. to initiate the IP negotiation, for example, using the voice session (e.g., using G.711). An IP based video link may be established between two or more users, for example, between data collaboration terminals 700 using network interface 715 and LAN 730. The system may negotiate IP parameters for the videoconference and/or data collaboration session using tone signals, for example, DTMF, which may be implemented using the voice session (e.g., using G.711), optionally together with audio data. In the case where DTMF signals are used to transfer data relevant for generating the IP call, one or more endpoints may remove the DTMF sounds so the participants will not hear the DTMF signaling (e.g., silent DTMF). DTMF signals, for example, may include data such as IP addresses of data collaboration terminals 110, data collaboration terminal capabilities, gateway IP addresses, URLs, DNSs, and other suitable unique identifiers. In other embodiments SVD technology may be used to transmit signals, data etc.

In one embodiment the PSTN link may stay connected during the entire session. This method may ensure that the audio is relatively stable and clear, as compared to IP audio quality. In another embodiment, the audio channel (PSTN) may be closed and the audio data moved to the IP channel, which may thereafter carry the audio and video data. In some cases the audio session may be affected by the IP link of the session (internet). In one embodiment, the audio data may be digitalized, compressed, and transmitted between the users using wide band audio. This method may provide a relatively high quality of audio, for example, comparable to that of a PSTN line.

Figure 7B:
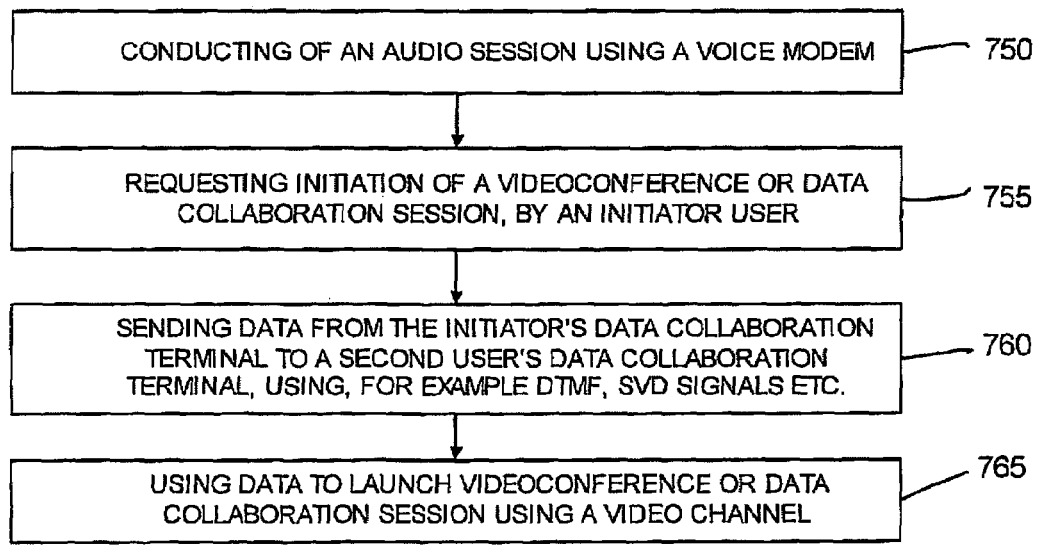
FIG. 7B is a flow chart depicting a method for initiating a videoconference and/or data collaboration using a network interface, according to an embodiment of the present invention.

Referring to FIG. 7B, at block 750 two or more users of data collaboration terminals 700 may be conducting an audio session using, for example, a voice modem 710, and audio I/O devices 720. At block 755 an initiator user may request initiation of a videoconference or data collaboration session, by, for example, pressing a button, dialing a code etc. At block 760, data may be sent from the initiator's data collaboration terminal to a second user's data collaboration terminal, using, for example DTMF, SVD signals etc. At block 765 the data received may be used to launch a videoconference or data collaboration session between the data collaboration terminals 700, using a video channel for the transmission of video data. In some embodiments the audio data may be channeled through the video channel. In some embodiments wide band audio may be used to enable high quality vice data to be sent via the audio channel.

Figure 8:
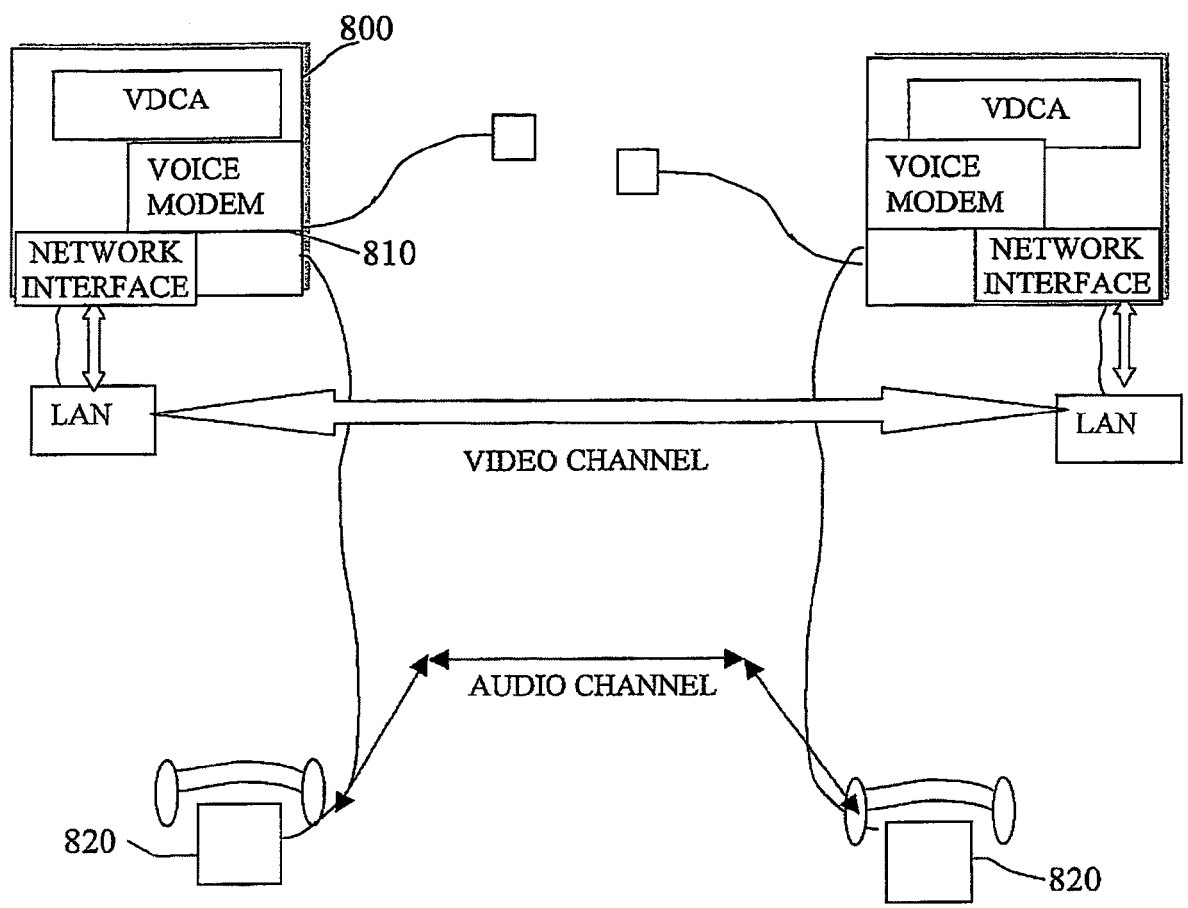
FIG. 8 depicts a workflow between components of a videoconference and/or data collaboration system, according to some embodiments of the present invention.

In one embodiment of the present invention, as can be seen with reference to FIG. 8, a configuration is provided to enable initiation of point-to-point videoconferencing or data collaboration with a voice modem 810 and a use of an external telephone, for example, a meeting room telephone 820. This configuration is very similar to the configuration described with reference to FIGS. 7A-7B, however a regular audio communication terminal, for example, of the conference room or office, may be used throughout the videoconference and/or data collaboration session, instead of the voice modem and microphone.

Figure 9A:
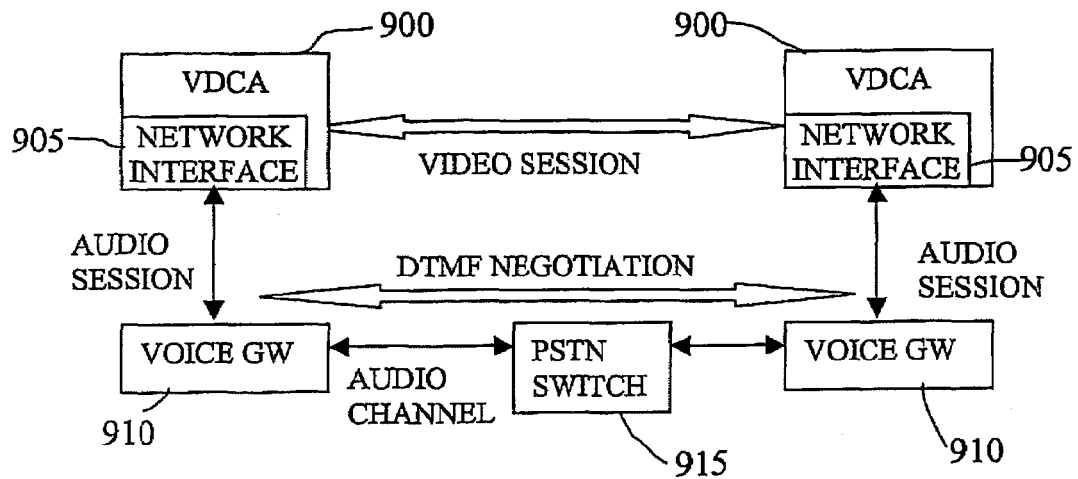
FIG. 9A depicts a workflow between components of a videoconference and/or data collaboration system, according to some embodiments of the present invention.

In one embodiment of the present invention, as can be seen with reference to FIG. 9A, a configuration is provided to enable initiation of point-to-point videoconferencing or data collaboration using a voice Gateway (GW) 910 to connect between user terminals 900. The voice GW may enable conversion between analog voice channel(s) (e.g. PSTN, ISDN etc.) and digital representation(s) of voice, typically packetized over an IP network. For example the analog voice data may be converted for use over an IP channel, for example, using H.323, H.320, SIP, or other suitable protocols.

In this configuration a network interface 905 may be used to transmit standard audio only calls to a PSTN switch 915, via the voice GW 910. No voice modem or phone may be required. As can be seen in FIG. 9A, IP parameters may be exchanged using the voice channel, for example, using DTMF (e.g., silent DTMF), SVD etc. In such a configuration, the audio quality may be substantially similar to the quality of regular PSTN calls, however the quality may also be affected by the packet loss in the internal company LAN. The IP information may be exchanged between the users using the audio session with the remote side. Based of the IP information, an IP session may be opened for video only. The IP connection may be initiated to conduct a videoconference and/or data collaboration session between two or more users, for example, using H.323, H320, SIP etc. As described in relation to FIGS. 7A-7B and FIG. 8, embodiments may be provided wherein the audio session is maintained or closed. In the configuration depicted in FIG. 9A, the lip sync problem may be solved, for example, by having both audio and video data transmitted via the IP channel, for example, using H.323, H.320, SIP protocol etc., or by using endpoints which are already equipped to be synchronized. In some embodiments there may be no need for changing or adding hardware, for example, delay lines or buffers, to the user endpoints, as this configuration may require a purely software implementation.

Figure 9B:
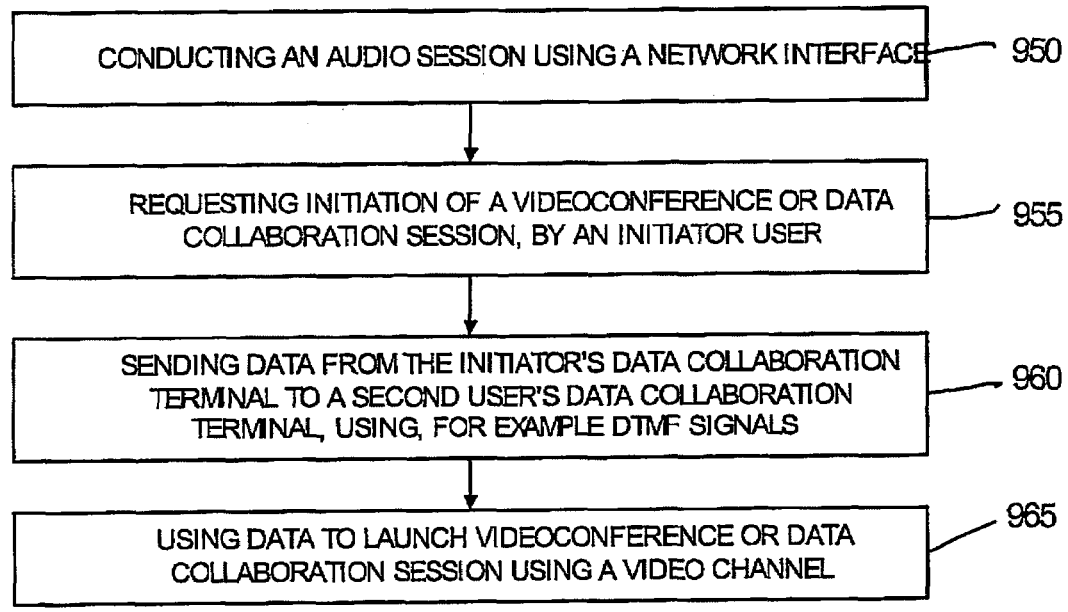
FIG. 9B is a flow chart depicting a method for initiating a videoconference and/or data collaboration using a voice gateway, according to an embodiment of the present invention.

Referring to FIG. 9B, at block 950 two or more users of data collaboration terminals 900 may conduct an audio session, for example, using a network interface 905, and suitable I/O devices. At block 955 an initiator user may request initiation of a videoconference or data collaboration session, by, for example, pressing a button, dialing a code etc. At block 960, data may be sent from the initiator's data collaboration terminal to a second user's data collaboration terminal, using, for example DTMF signals or other suitable audio signals. At block 965 the data received may be used to launch a videoconference or data collaboration session, using a video channel for the video data. In some embodiments the audio data may be channeled through the video channel. In some embodiments wide band audio may be used to enable high quality vice data to be sent via the audio channel.

Figure 10A:
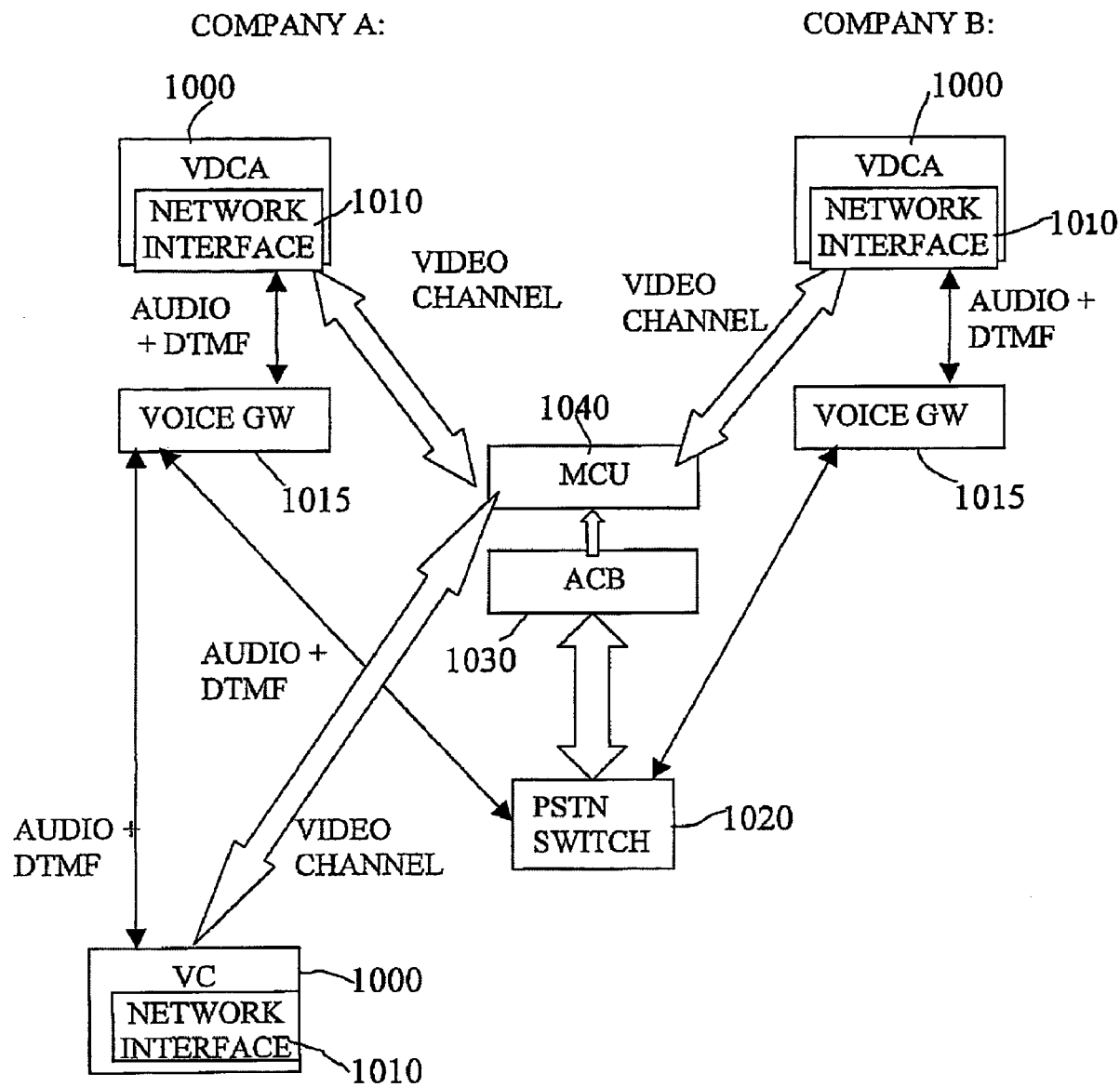
FIG. 10 depicts a workflow between components of a videoconference and/or data collaboration system, according to some embodiments of the present invention.
FIG. 10B is a flow chart depicting a method for initiating a multi-user videoconference and/or data collaboration using a voice gateway, according to an embodiment of the present invention.

In one embodiment of the present invention, as can be seen with reference to FIG. 10A, a configuration may be provided to enable multipoint calling for a plurality of data collaboration terminals 1000, using a voice gateway (GW) 1015, PSTN switch 1020, audio conference bridge (ACB) 1030, and multipoint conference unit (MCU) 1040. The ACB 1030, which may be, for example, an integrated graphics controller (IGC), may enable generation of a bridge or a voice conference for a plurality of users. The ACB 1030 may be directed to bridge an analog (e.g., PSTN, ISDN etc.) session and/or a digital session (e.g. IP), for example, as have been described in U.S. Pat. No. 6,501,739, filed May 25, 2000, entitled "Participant-controlled conference calling system", and patent application, publication No. US-2003-0112947-A1, filed Nov. 25, 2002, entitled "TELECOMMUNICATIONS AND CONFERENCE CALLING DEVICE, SYSTEM AND METHOD", which are hereby incorporated fully by reference. The MCU, for example, a video conferencing bridge (e.g., VCB 2000, from VCON Ltd., Herzlia, Israel), may enable handling of videoconferences and/or data collaboration sessions between pluralities of participants. Data collaboration terminals 1000 may conduct voice calls using network interfaces 1010, voice modems, etc.

Figure 10B:
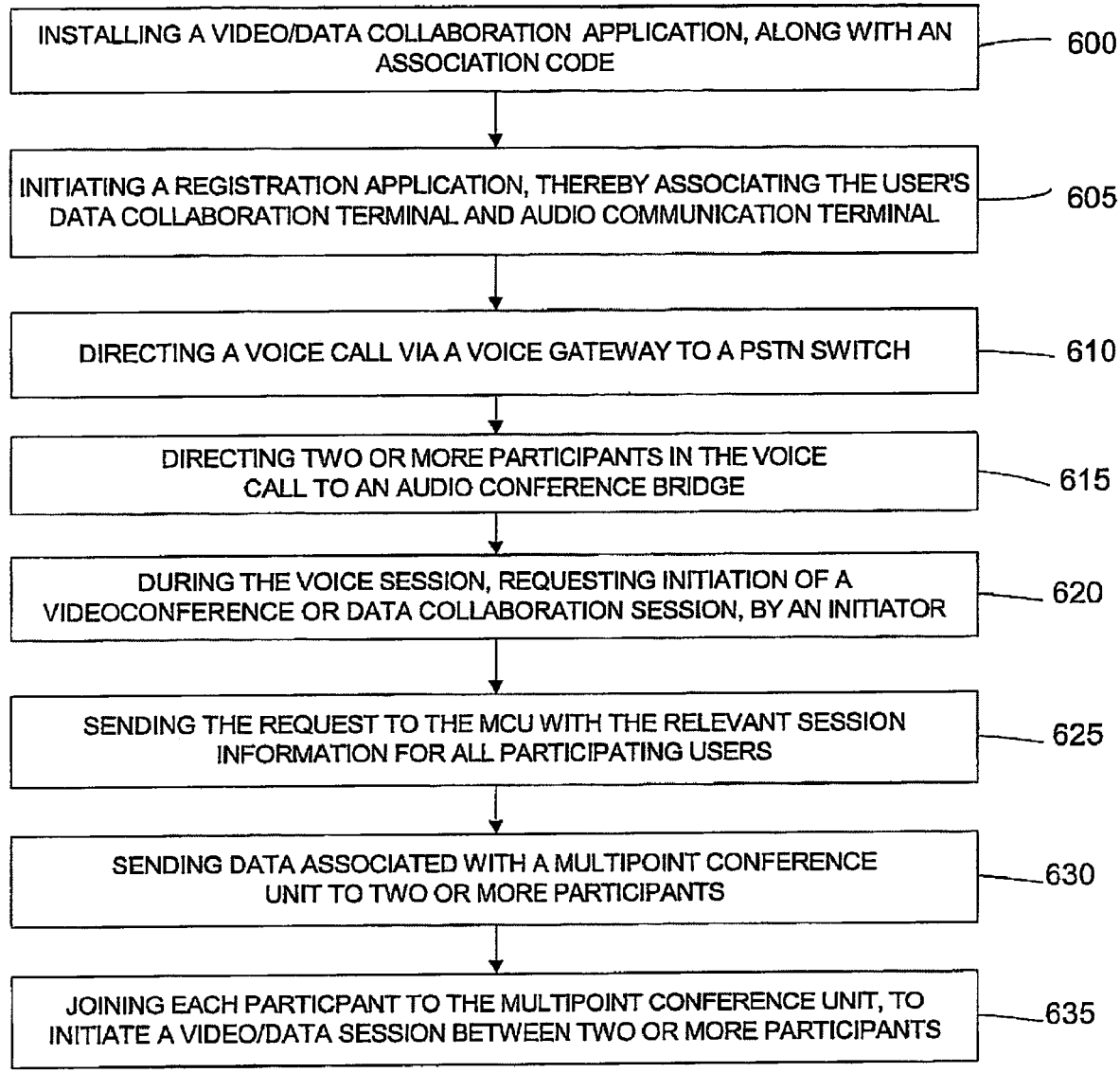

Referring to FIG. 10B, at block 600 a user may install a video/data collaboration application (herein referred to as "VDCA"), along with which an association code may be received, to a data collaboration terminal 1000. The installation process may include downloading the VDCA, loading it from a CD, or otherwise installing the VDCA. Installation may be manual, automatic, or initiated from a central server without the user intervention.

Either as part of block 600 or at a later stage, at block 605 a registration application may be activated on the user's data collaboration terminal 1000, at block 605. The registration application may reside on the data collaboration terminal 1000, or on a web server. As part of the registration process, for example, the user may provide telephone identification data, for example, of audio communication terminal 1000 (e.g., PSTN telephone number) that a user desires to be associated with the VDCA. The registration application may generate an association between the user's audio communication terminal and data collaboration terminal 1000, for example, using one or more unique identifiers (e.g., the data collaboration terminal's MAC Address, current IP address, Global Unique ID (GUID), or other identifications attributes. This association between the audio communication terminal identification data and data collaboration terminal identifier(s) may be stored in a central database. If two or more users are participating in a PSTN voice session, at least one user's audio communication terminal may receive and store the telephone number(s) or other unique identifier(s) of the other participant(s) audio communication terminal(s).

At block 610, a voice call may be initiated, for example, from an data collaboration terminal 1000 by having a voice call from the data collaboration terminal directed via the Voice GW 1015 to the PSTN switch 1020. The data collaboration terminal 1000 may use a voice modem, network card or other suitable communication means. The voice call may conducted by using a voice modem, network interface 1010, or by other suitable means.

At block 615 the voice call may then be directed from the PSDN switch to the ACB 1030. All users participating in the voice call may be connected to the ACB 1030 and may send their IP information using dial tones, for example, DTMF, to the ACB 1030. During the voice session, at block 620, one of the users, herein the initiator, may send a signal, for example, by pressing a predefined button or combination of buttons on his/her audio communication terminal (e.g., *33# or any other buttons or combinations of buttons) to request initiation of a videoconference or data collaboration session.

At block 625 the ACB 1030 may identify the received signal, code or combination etc. as request for initiating a video/data session between two or more users. The ACB 1030 may send the request to the MCU 1040 with the relevant session information for all participating users.

At block 630, the MCU 1040 may return data to the ACB 1030, for example, including the session parameters for the MCU 1040. This data may be sent by the ACB 1030 to the data collaboration terminals 1000, for example, using DTMF signals.

At block 635 each data collaboration terminal 1000 may be connected to the MCU 1040, to initiate a video/data session between two or more participants.

Since DTMF information may be blocked by the ACB 1030, the ACB 1030 may send the MCU 1040 the session information. In this way, the endpoint that wants to add a video channel to the audio conference may generate a video multipoint session by accessing the MCU session (instead of the other party information), as can be seen with reference to FIG. 10A. Using configurations as described by FIGS. 7A-7B and/or FIGS. 9A-9B, together with the ACB 1030, may enable synchronization between audio and video information (referred to herein as "lip sync") and conducting an audio conference together with the voice conference.

Figure 11:
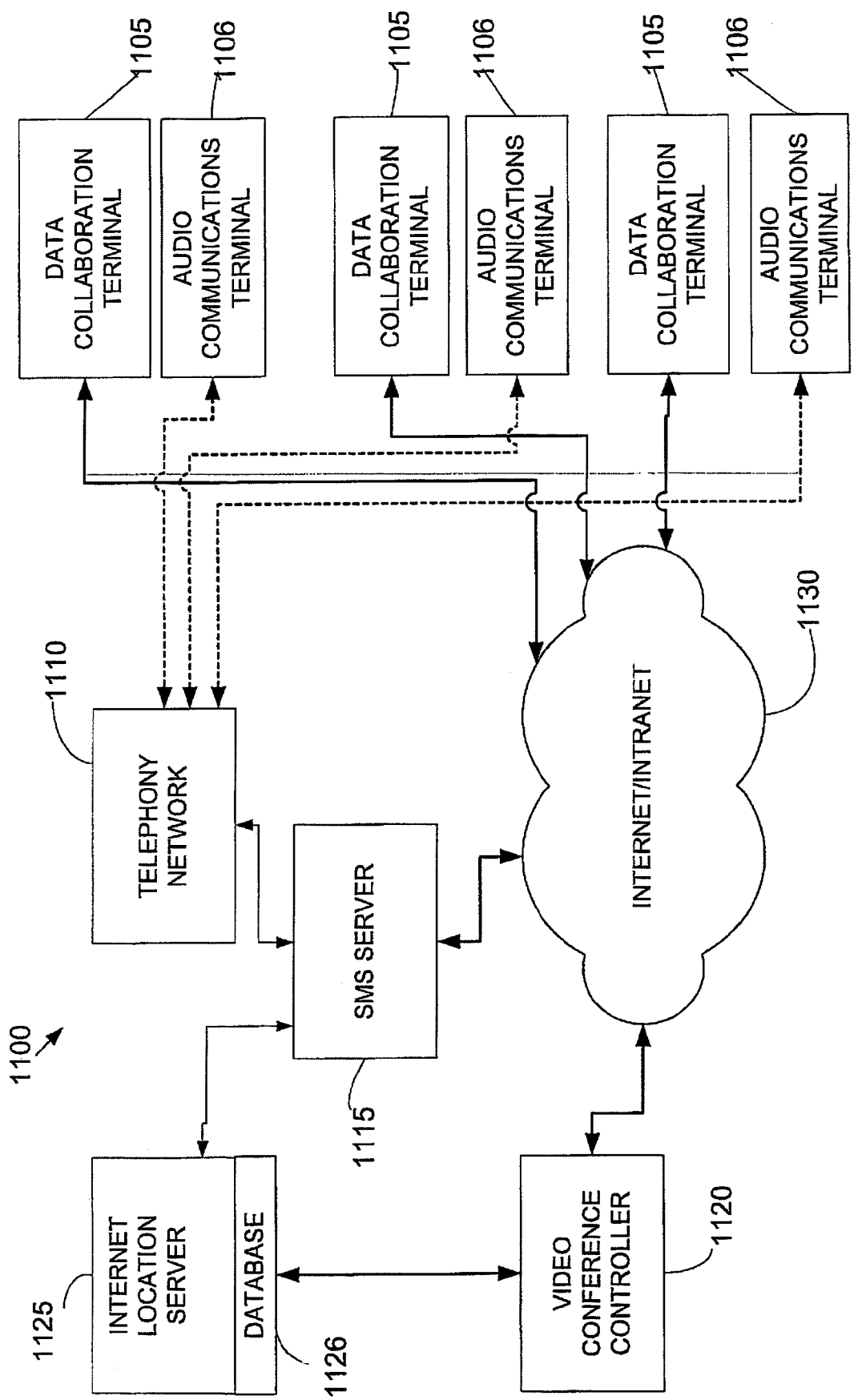
FIG. 11 depicts a videoconference and/or data collaboration system including an SMS controller, according to an embodiment of the present invention.

According to some embodiments of the present invention, an on line data/multimedia collaboration session may be automatically initiated from a regular voice telephony conversation, using voice over PSTN to transmit audio data, and data and video over Internet to transmit video and/or other data. For example, voice signals may be combined with video data, graphic data (e.g., PowerPoint presentations etc.), Internet content, and other required data. FIG. 11 depicts a videoconference and/or data collaboration system 1100 including a data network 1130, telephony network 1110, SMS server 1115, conference server 1120, and an Internet location server 1125, according to an embodiment of the present invention. A plurality of users may communicate with each other, for example using data collaboration terminals 1105, optionally equipped with a videoconference and/or data collaboration application (VDCA), and/or audio communication terminals 1106. Such communication may include audio only, video only, videoconferencing, and/or data collaboration sessions, using the components of videoconference and/or data collaboration system 1100. In some embodiments a data collaboration terminal 1105 and audio communication terminal 1106 may be separate components. In other embodiments collaboration terminal 1105 and audio communication terminal 1106 may be included within a combined component. In some embodiments, a MCU may be included, to enable multiple users to conduct a videoconference or data collaboration session.

Figure 12:
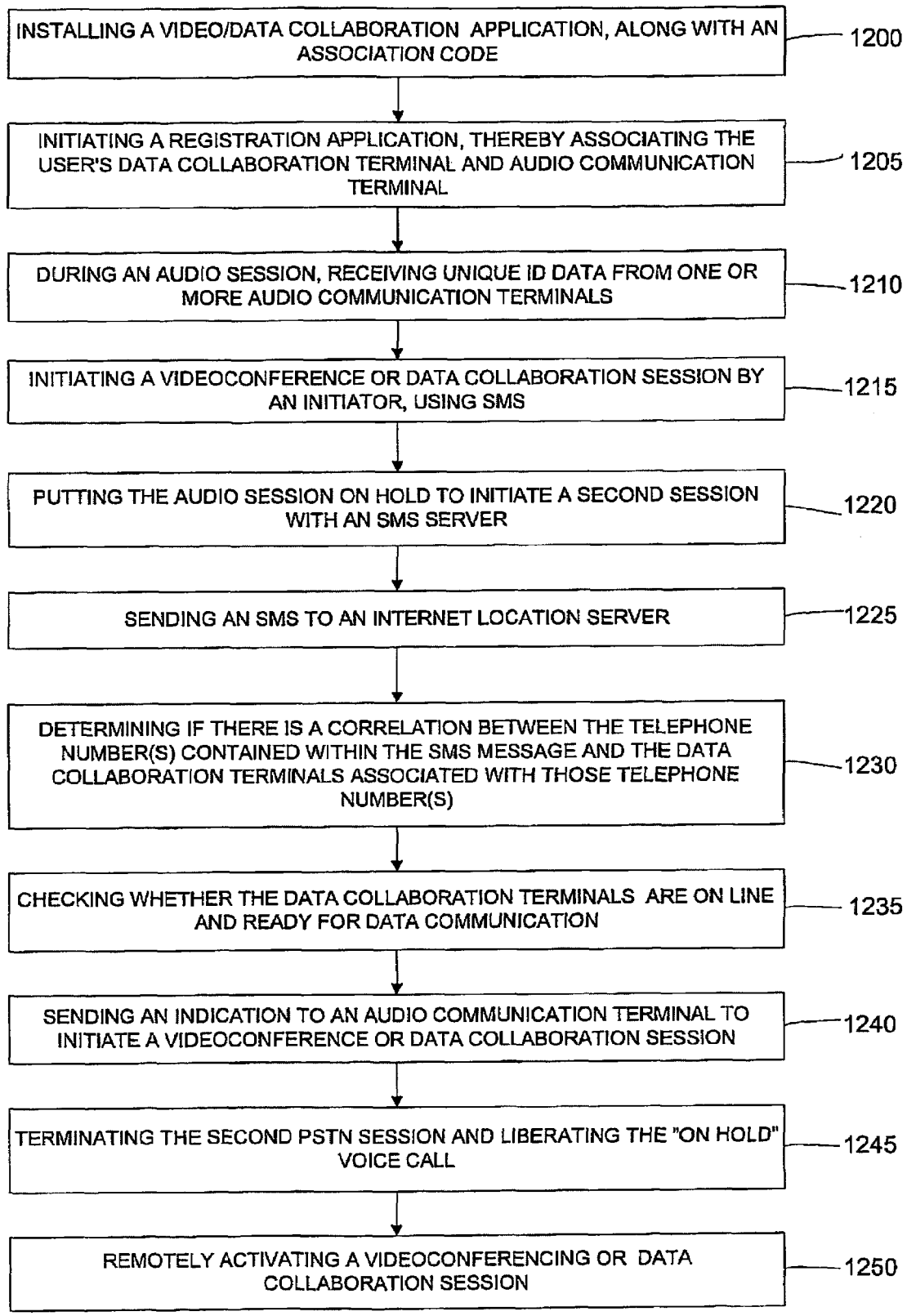
FIG. 12 is a flow chart depicting a method for initiating a videoconference and/or data collaboration using SMS messaging, according to an embodiment of the present invention.

FIG. 12 is a flow chart depicting a method for initiating a videoconference and/or data collaboration session using SMS, according to an embodiment of the system and method of the present invention. Referring to FIG. 12, in block 1200 a user may install a video/data collaboration application (VDCA), along with which an association code may be received, to a data collaboration terminal 1105. The installation process may include downloading the VDCA, loading it from a CD, or otherwise installing the VDCA. Installation may be manual, automatic, or initiated from a central server without the user intervention.

Either as part of block 1200 or at a later stage, a registration procedure, which may be a one-time event, may be initiated on the user's data collaboration terminal 1105, at block 1205. The registration procedure may be implemented, for example, by an application that may reside on the data collaboration terminal 1105, or on a web server. As part of the registration process, for example, the user may provide telephone identification data, for example, of audio communication terminal 1106 (e.g., PSTN telephone number) that a user desires to be associated with the data collaboration terminal 1105. The registration application may generate an association between the user's audio communication terminal 1106 and data collaboration terminal 1105, for example, using one or more unique identifiers (e.g., the PC terminal's MAC Address, current IP address, Global Unique ID (GUID), or other identifications attributes. This association between the audio communication terminal identification data and data collaboration terminal identifier(s) may be stored in a central database 1126, for example, a database associated with an Internet location server 1125, which may be distributed among a plurality of locations. In one embodiment the registration application may generate an SMS message (e.g., via the Internet location server 1125 and the SMS server 1115), to the audio communication terminal 1106, to verify the audio communication terminal number given by the user. The audio communication terminal 1106 may be required to support SMS, for example including reception of SMS messages. In some cases a user may confirm registration through, for example, the audio communication terminal 1106, for example by pressing an affirmation key or another suitable key or combinations of keys.

At block 1210, if two or more users are participating in a PSTN voice session, and at least one of the users (to be designated as the initiator) has an SMS enabled audio communication terminal 1106, the initiator's audio communication terminal 1106 may receive and store the telephone number(s) or other unique identifier(s) of the other participant(s) audio communication terminal(s). For example, these identifier's may be identified using CLI (Caller Line Identification), which is the presentation of the incoming callers telephone number, in case another participants had generated the PSTN voice session, or by using registration of the dial out number if the local participant (the initiator) generated the voice session by calling the other party(s). The initiator's audio communication terminal 1106 may be required to support SMS, have a connection to SMS server 1115, and may also be required to support Caller Line Identification (CLI), "call holding", and other suitable features. The initiator's audio communication terminal 1106 may require being connected to a telephony network that supports these or other suitable features. The initiator's audio communication terminal 1106 may also be required to include suitable hardware and/or software elements to enable implementation of the presently described embodiment or other suitable embodiments.

At block 1215, typically upon agreement (e.g., oral) between the users, the initiator may initiate a videoconference and/or data collaboration session, for example, by pressing a button on his/her audio communication terminal 1106. The audio communication terminal 1106 may generate an SMS message, for example, a pre-configured and/or automated message, which may contain the identifiers of the other participant(s) audio communication terminal(s) (e.g., telephone number(s)), and a command to set up a teleconference or data collaboration session. The SMS may be sent from a landline communication terminal over an audio channel, for example a PSTN or ISDN network etc. (herein referred to as fixed-network short messages, or "F-SMS"), and/or from a wireless (e.g., cellular) communication terminal over a wireless channel, or May use other suitable communications networks. d This SMS may be sent to the SMS server 1115. The initiator's audio communication terminal identifier (e.g., phone number) may be contained within the SMS message, or may be fetched by the SMS server 1115 from the telephony network 1110. In addition, the SMS message may contain other attributes, for example a selection of required VDCA identifiers from a list of predefined VDCA types (e.g., Video Conference, Data Collaboration, Remote Medical Care, etc,). In order to send the SMS message over the PSTN line, the initiator's audio communication terminal 1106 may include a PSTN modem, to enable communication of digital data between the audio communication terminal 1106 and the SMS server 1115, as is known and used in the art.

In some cases (e.g. the initiator audio communication terminal 1106 is connected to a PSTN network), the initiator audio communication terminal 1106 may send the SMS on the same channel as of the voice, while maintaining a voice session with at least one other party, at block 1220 the voice session may automatically be put on "hold", while the audio communication terminal 1106 generates another phone call directed to the SMS server 1115, and sends the SMS message to the SMS server 1115 using the audio communication terminal's PSTN modem. In other embodiments, Simultaneous Voice and Data (SVD) technology may be used to send the SMS data from the initiator communication terminal 1106, and thus the "hold" mechanism may be unnecessary. Some networks (e.g. GPRS), have an intrinsic support for having an audio and data channel in parallel. In these cases the "hold" mechanism may also be unnecessary. The SMS message may include at least one identifier that distinguishes it from a standard SMS message, for example by having a special destination number for the SMS message, which the SMS server 1115 can identify.

At block 1225 the SMS server 1115 may recognize that the SMS message received from the initiator is of the type that serves to initiate a videoconference and/or data collaboration session. The SMS server 1115 may forward such a message or the data contained in such a message to the Internet location server (ILS) 1125. The SMS server 1115 and the ILS 1125 may be connected via the IP network 1130, using for example the SMPP protocol or other suitable protocols.

At block 1230 the ILS 1125 may search in database 1126 (e.g., which may be local or distributed database) to find a correlation between the telephone number(s) contained within the SMS message and at least one unique identifier of the data collaboration terminals 1105 associated with these telephone number(s). The ILS 1125 may make a validity check to test, for example, if the two or more participants are registered in database 1126, and that the registered participants have the right to use to use a specific VDCA type, and/or other suitable criteria At block 1235 the ILS 1125 may connect to the Video Conferencing Controller (VCC) 1120, to check, for example, whether the data collaboration terminals 1105 are on line and ready for data communication.

At block 1240, if the validity check is positive, the ILS 1125 may return a success indication to the SMS server 1115, which may forward this indication to the audio communication terminal(s) 1106, by using, for example, an SMS acknowledge code. In a similar manner, a negative validation may generate an error code, for example using SMS error codes that may be sent to the audio communication terminal(s) 1106.

At block 1245, upon receiving the success/error indication, the user audio communication terminal 1105 may terminate the PSTN session, which was generated at block 1215. The user audio communication terminal 1105 may alternatively or additionally release the voice session between the users from its "hold" state, in cases where the "hold" mechanism is employed as described at block 1220. A notification may be displayed or otherwise given over to the user, for example via a message on the audio communication terminal screen.

At block 1250 the ILS 1125 may command the VCC 1120 to imitate the video/data session and remotely activate the VDCA sessions using the data collaboration terminal(s) 1105. For example, Remote Call Initiation (RCI) may be used to initiate a videoconference or data collaboration session between two or more data collaboration terminals. The VCC 1120 may also keep track of the changes in the IP address of the data collaboration terminal(s), within a session and between different sessions (for example by using an H.323 gatekeeper to get the current IP of a data collaboration terminal during the H.323 gatekeeper registration process, and/or during the session). The VCC 1120 may create a corresponding video and data call between the two associated data collaboration terminals 1105, thereby enabling a Video/Data session to be run in parallel with the initial voice session.

Figure 13:
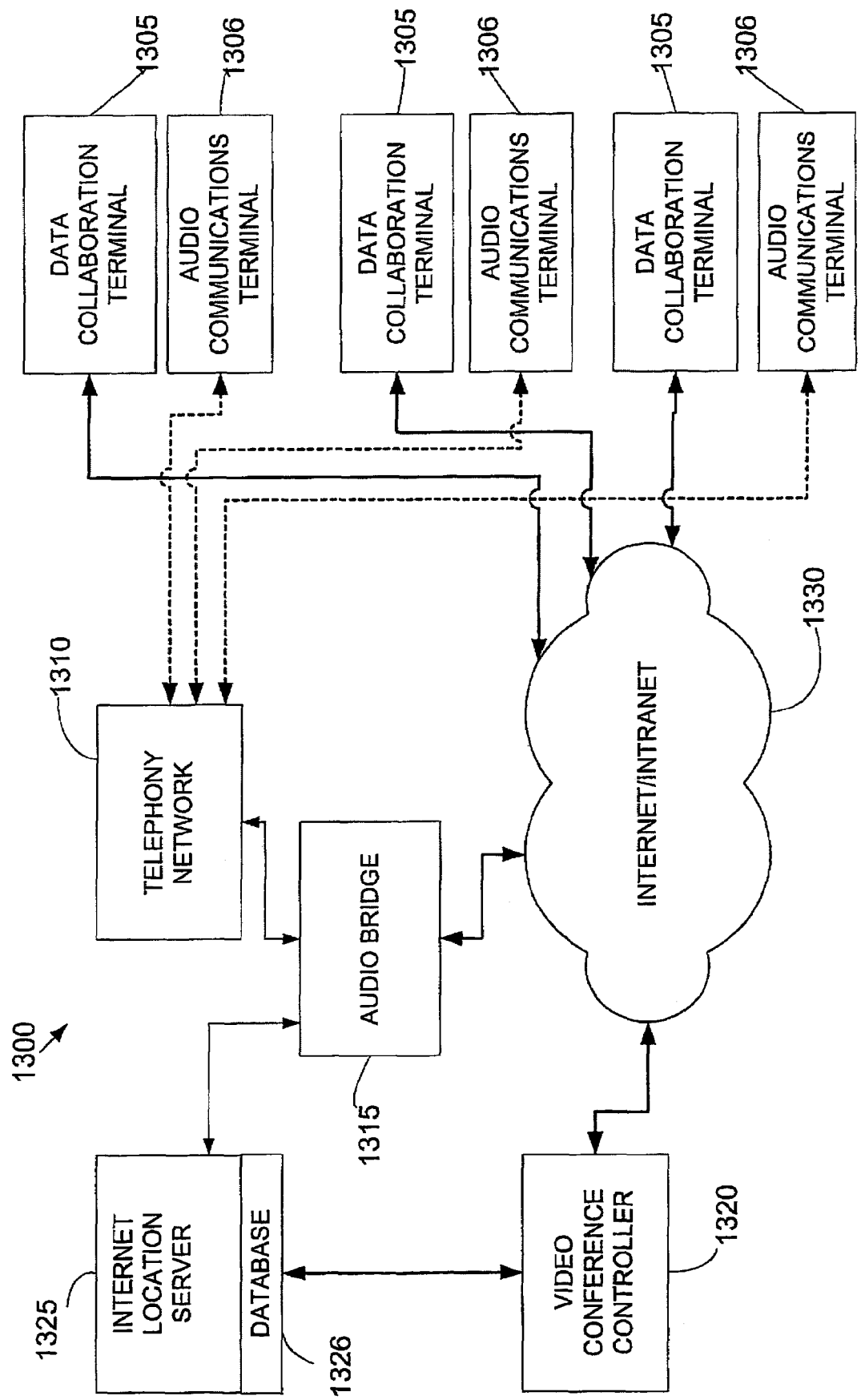
FIG. 13 depicts a videoconference and/or data collaboration system including an audio bridge, according to an embodiment of the present invention.

According to some embodiments of the present invention, FIG. 13 depicts a videoconference and/or data collaboration system 1300 including a network 1330, telephony network 1310, audio bridge 1315, conference server 1320, and an Internet location server 1325, according to an embodiment of the present invention. Audio bridge 1315 may be connected to one or more audio communication terminals 1306, and may receive DTMF signals, SVD signals, or other suitable signals, commands, or data etc. The signals, which may include, for example, requests to establish a videoconference or data collaboration session, may be identified, and may be sent to Internet location server 1325. In some embodiments, a MCU may be included, to enable multiple users to conduct a videoconference or data collaboration session. Audio communication terminals 1306 may be associated with data collaboration terminals 1305. Audio communication terminals 1306 may separate from their associated data collaboration terminals 1305, or may be combined with their associated data collaboration terminals 1305.

Figure 14:
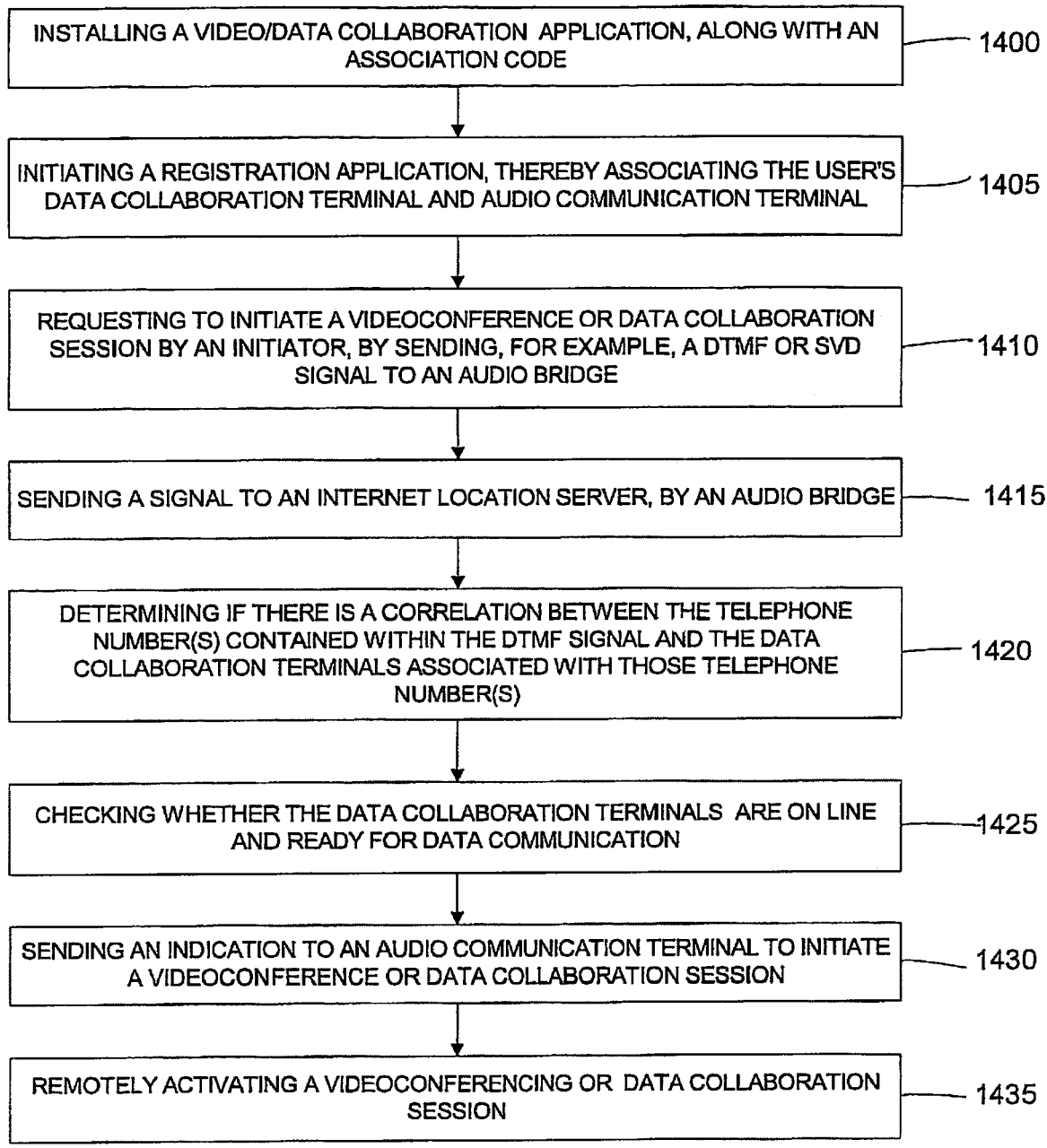
FIG. 14 is a flow chart depicting a method for initiating a videoconference and/or data collaboration using an audio bridge, according to an embodiment of the present invention.

FIG. 14 is a flow chart depicting a method for initiating a videoconference and/or data collaboration session according to an embodiment of the system and method of the present invention, as described with reference to FIG. 13. Referring to FIG. 14, in block 1400 a user may install a video/data collaboration application (VDCA), along with which an association code may be received, to a data collaboration terminal 1305. The installation process may include downloading the VDCA, loading it from a CD, or otherwise installing the VDCA. Installation may be manual, automatic, or initiated from a central server without the user intervention.

Either as part of block 1400 or at a later stage, a registration procedure, which may be a one-time event, may be initiated on the user's data collaboration terminal 1305, at block 1405. The registration procedure may be implemented, for example, by an application that may reside on the data collaboration terminal 1305, or on a web server. As part of the registration process, for example, the user may provide telephone identification data, for example, of audio communication terminal 1306 (e.g., PSTN telephone number) that a user desires to be associated with the VDCA. The registration application may generate an association between the user's audio communication terminal 1306 and data collaboration terminal 1305, for example, using one or more unique identifiers (e.g., the PC terminal's MAC Address, current IP address, Global Unique ID (GUID), or other identifications attributes. This association between the audio communication terminal identification data and data collaboration terminal identifier(s) may be stored in a central database 1326, for example, a database associated with an Internet Location Server 1325, which may be distributed among a plurality of locations.

At block 1410, if two or more users are participating in a PSTN voice session, and at least one of the users (to be designated as the initiator) has an DTMF enabled data collaboration terminal, the initiator may make a request to initiate a videoconference and/or data collaboration session, for example, by pressing a button on his/her audio communication terminal 1306. The audio communication terminal 1306 may generate a DTMF signal, for example, a pre-configured and/or automated signal, which may contain the command to set up a teleconference or data collaboration session. The DTMF signal may be sent from a landline communication terminal over PSTN, and/or from a wireless (e.g., cellular) communication terminal. This DTMF signal may be sent to the audio bridge 1315. The initiator's audio communication terminal identifier (e.g., phone number) may be contained within the DTMF signal, or may be fetched by the audio bridge 1315 from the PSTN network 1310. In some cases, a list of participant numbers per a given voice conference might be previously stored in the audio bridge 1315 memory or on another storage media. In addition, the DTMF signal may contain other attributes, for example a selection of required VDCA identifiers from a list of pre-defined VDCA types (e.g., Video Conference, Data Collaboration, Remote Medical Care, etc,).

At block 1415 the audio bridge 1315 may recognize that the DTMF signal received from the initiator is of the type that serves to initiate a videoconference and/or data collaboration session. The audio bridge 1315 may forward such a message or the data contained in such a message to the Internet location server (ILS) 1325. The audio bridge 1315 and the ILS 1325 may be connected via the IP network 1330, using for example the SMPP protocol.

At block 1420 the ILS 1325 may search in database 1326 (e.g., which may be local or distributed database) to find a correlation between the telephone number(s) contained within the DTMF signal and the data collaboration terminals 1305 associated with those telephone number(s). The ILS 1325 may make a validity check to test if the two or more participants are registered in database 1326.

At block 1425 the ILS 1325 may connect to the Video Conferencing Controller (VCC) 1320, to check, for example, whether the data collaboration terminals 1305 are on line and ready for data communication.

At block 1430, if the validity check is positive, the ILS 1325 may return a success indication, for example, using a DTMF based acknowledge code, to the audio bridge 1315, which may forward this indication to the audio communication terminal(s) 1306. In a similar manner, a negative validation may generate an error code, for example using DTMF error codes that may be sent to the audio communication terminal(s) 1306.

At block 1435 the ILS 1325 may command the VCC 1320 to imitate the video/data session and remotely activate the VDCA sessions using the data collaboration terminal(s) 1305. The VCC 1320 may also keep track of the changes in the IP address of the data collaboration terminal(s), within a session and between different sessions. (for example by implementing an H.323 gatekeeper and getting the current IP data collaboration terminal during the H.323 gatekeeper registration process and through the session ) The VCC 1320 may create a corresponding video and data call between the two associated data collaboration terminals 1305, thereby enabling a Video/Data session to be run in parallel with the initial voice session.

In other embodiments SVD signals may be used in place of or in addition to DTMF signals. The method described above is not limited to PSTN, for example, ISDN and cellular communication devices and networks (e.g., using GSM, GPRS, EDGE and UMTS) may be used. As these networks typically have separate data and voice channels. In some embodiments the request to initiate a videoconference and/or data collaboration session may be sent using the data channel, while the voice channel is kept without interruption. Other blocks or combinations of blocks may be used.

According to some embodiments of the present invention, telephone and/or SMS initiated videoconferencing may enable Video point to point calls, Elderly Support, Deaf and Hard Hearing Support, Home Surveillance, Remote tech. Support, Sharing digital images, Enhanced Directory Services, and other suitable features and functions.

It will be appreciated by persons skilled in the art that the present invention is not limited by what has been particularly shown and described hereinabove. Alternate embodiments are contemplated which fall within the scope of the invention.

What is claimed is:

1. A system comprising: an SMS server; a server; and an Internet location server in communication with the SMS server and the server; wherein upon receiving an SMS by the SMS server, the Internet location server receives signals from the SMS server indicating that an audio session is taking place among a plurality of endpoints, the Internet location server transmits a signal to the server, and the server, upon receipt of the signal, initiates a data collaboration session between the plurality of endpoints.

2. The system of claim 1 comprising a database including data collaboration session enabled endpoints.

3. The system of claim 1 wherein the server transmits a data collaboration request to a data collaboration terminal.

4. The system of claim 1 wherein the signals indicating that an audio session is taking place include at least the address of an audio communication terminal.

5. The system of claim 1 wherein the signals indicating that an audio session is taking place include at least a telephone number.

6. The system of claim 1 wherein the server is a videoconference server.

7. The system of claim 1 wherein the endpoints include audio communication terminals which communicate via a PBX.

8. The system of claim 1 wherein the endpoints include data collaboration terminals which communicate via an IP network.

9. The system of claim 1 wherein the audio information for the data collaboration session is transmitted by the audio session.

10. The system of claim 9 wherein the audio information is transmitted by DTMF.

11. The system of claim 9 wherein the audio information is transmitted by SMS.

12. The system of claim 1 wherein the step of initiating a data collaboration session includes at least the step of altering an answer mode of the relevant endpoints.

13. The system of claim 1 wherein the audio communication detection accepts a user request for a data collaboration session.

14. A method comprising: during an audio session between a plurality of users, associated with a unique ID data received from an audio communication terminal; initiating a data collaboration session by a user participating in the audio session, using SMS; sending an SMS to an Internet location server; sending an indication to an audio communication terminal to initiate a data collaboration session; and remotely activating a data collaboration session.

15. The method of claim 14, comprising initiating a registration application, thereby associating the user's data collaboration terminal and audio communication terminal.

16. The method of claim 14, comprising putting the audio session on hold to initiate a communication session with an SMS server.

17. The method of claim 16, comprising terminating the communication session and liberating the audio session.

18. The method of claim 14, comprising determining if there is a correlation between said ID data contained in the SMS message and the data collaboration terminal associated with the ID data.

19. The method of claim 14, comprising checking whether the data collaboration terminals are on line and ready for data communication.

* * * * *